(12) United States Patent
Yamamuro et al.

(10) Patent No.: US 8,105,500 B2
(45) Date of Patent: Jan. 31, 2012

(54) SLURRY RHEOLOGY MODIFIER

(75) Inventors: Hotaka Yamamuro, Wakayama (JP);
Koji Koyanagi, Wakayama (JP);
Daisuke Shiba, Wakayama (JP)

(73) Assignee: Kao Corporation, Tokyo (JP)

(*) Notice: Subject to any disclaimer, the term of this patent is extended or adjusted under 35 U.S.C. 154(b) by 531 days.

(21) Appl. No.: 12/113,111

(22) Filed: Apr. 30, 2008

(65) Prior Publication Data

US 2008/0300341 A1 Dec. 4, 2008

Related U.S. Application Data

(62) Division of application No. 10/170,341, filed on Jun. 14, 2002, now Pat. No. 7,374,699.

(30) Foreign Application Priority Data

Jun. 15, 2001 (JP) .................. 2001-182308
Jul. 31, 2001 (JP) .................. 2001-232147
Feb. 19, 2002 (JP) .................. 2002-041852

(51) Int. Cl.
*C09K 3/00* (2006.01)

(52) U.S. Cl. ............. 252/183.13; 252/183.11; 106/822; 106/823; 106/819; 106/778; 106/782; 106/732; 106/726; 106/727; 106/608; 106/624; 106/715; 106/708; 106/714

(58) Field of Classification Search ............. 252/183.13, 252/183.11; 106/822, 823, 819, 778, 782, 106/732, 726, 727, 608, 624, 715, 714, 708
See application file for complete search history.

(56) References Cited

U.S. PATENT DOCUMENTS

| | | | |
|---|---|---|---|
| 3,954,660 A | 5/1976 | Kennedy et al. | |
| 4,008,165 A | 2/1977 | Maddox, Jr. et al. | |
| 4,375,421 A | 3/1983 | Rubin et al. | |
| 4,412,018 A * | 10/1983 | Finlayson et al. | 523/508 |
| 4,418,755 A | 12/1983 | Sifferman | |
| 4,426,310 A | 1/1984 | Verunica | |
| 4,502,887 A | 3/1985 | Tsuda | |
| 4,800,036 A | 1/1989 | Rose et al. | |
| 4,842,771 A | 6/1989 | Rorig et al. | |
| 5,055,219 A | 10/1991 | Smith | |
| 5,078,896 A | 1/1992 | Rorig et al. | |
| 5,470,383 A | 11/1995 | Schermann et al. | |
| 5,473,059 A | 12/1995 | Yeh | |
| 5,747,436 A | 5/1998 | Patel et al. | |
| 6,372,037 B1 | 4/2002 | Lebo, Jr. et al. | |
| 7,186,675 B2 | 3/2007 | Meine et al. | |

FOREIGN PATENT DOCUMENTS

| | | |
|---|---|---|
| DE | 43 20 508 A1 | 12/1994 |
| EP | 0 835 983 A2 | 4/1998 |
| JP | 3-38224 B2 | 6/1991 |
| JP | 5-39901 B2 | 6/1993 |
| JP | 7-166150 A | 6/1995 |
| JP | 9-301846 A | 11/1997 |
| JP | 11-189452 A | 7/1999 |
| WO | WO-98/56497 A1 | 12/1998 |
| WO | WO 02/22770 | 3/2002 |

OTHER PUBLICATIONS

Choi et al., "Shear-induced microstructure and rheology of cetylpridinium chloride/sodium salicylate micellar solutions," Received Nov. 15, 2000, Korea-Australia Rheology Journal, vol. 12, No. 3/4, Dec. 2000, pp. 143-149.
Data WPI Week 199806, Thomas Scientific, London, GB; AN 1998-059071, XP002543762.
Lu et al., "Effect of variations in counterion to surfactant ratio on rheology and microstructures of drag reducing cationic surfactant systems," Rheol Acta, vol. 37, 1998, pp. 528-548.
Shikata, Toshiyuki, Surface, vol. 29, No. 5, p. 61, 1991.

* cited by examiner

*Primary Examiner* — Margaret Moore
(74) *Attorney, Agent, or Firm* — Birch, Stewart, Kolasch & Birch, LLP

(57) ABSTRACT

A slurry rheology modifier comprises a first water-soluble low-molecular compound [referred to hereinafter as compound (A)] and a second water-soluble low-molecular compound [referred to hereinafter as compound (B)] being different from the compound (A), wherein the viscosity of an aqueous solution at 20° C. prepared by mixing an aqueous solution $S_A$ (with a viscosity at 20° C. of 100 mPa·s or less) of compound (A) with an aqueous solution $S_B$ (with a viscosity at 20° C. of 100 mPa·s or less) of compound (B) in the ratio of 50/50 by weight can be at least twice as high as the viscosity of either aqueous solution before mixed.

9 Claims, 3 Drawing Sheets

6.0 μm

SLURRY RHEOLOGY MODIFIER

This application is a divisional application of application Ser. No. 10/170,341, filed on Jun. 14, 2002, now U.S. Pat. No. 7,374,699 the entire contents of which are hereby incorporated by reference and for which priority is claimed under 35 U.S.C. §120.

TECHNICAL FIELD

This invention relates to a rheology modifier for regulating the viscosity of slurry and in particular to a rheology modifier capable of conferring properties excellent in viscosity and segregation resistance on water-powder slurry comprising powder used as a civil engineering/building material, a concrete product material and a repairing material, a process for producing slurry by adding the modifier, and slurry comprising the modifier.

PRIOR ART

To regulate the rheological physical properties (e.g. viscosity) of slurry comprising water and powder, the techniques of regulating the water/powder ratio, changing the dispersed state of particles by a pH adjusting agent, or controlling the amount of excess water by adding a water-absorbing polymer have generally been used.

In particular, the technique of adding water-soluble polymeric compounds to slurry to utilize a thickening action resulting from tangling of the polymeric compounds achieves a high thickening effect at lower costs, and is thus practically utilized in a wide variety of uses mainly in the field of civil engineering and construction. For example, cellulose derivatives such as methyl cellulose and hydroxyethyl cellulose [JP-B No. 5-39901] and water-soluble polymeric compounds such as poly(ethylene oxide) [JP-A No. 11-189452] are used in paste, mortar, concrete under water, and self-compacting concrete, to improve segregation resistance.

However, in order that the water-soluble polymeric compounds are used to achieve an efficient thickening effect, the compounds having molecular weights higher than a certain level should be designed, and almost all compounds actually used have molecular weights of hundred thousands. These water-soluble polymers having high molecular weights hardly bring about sufficient viscosity without adding them together with water and powder and kneading the mixture for a long time, so there is a problem when a quick-working effect is desired. Further, use of such compounds as an aqueous solution is not practical because the viscosity of the aqueous solution is increased to make the addition operation and operativeness problematic. When the water-soluble polymeric compounds are used in hydraulic powder, there is the problem of curing retardation.

Generally, when the water-soluble polymeric compounds are used in paste, mortar and concrete, many compositions have a low ratio of powder (water/powder ratio, 30% or more), and as the water/powder ratio is increased in the composition, the stability of viscosity is deteriorated with time, and bleeding water appears and the material is separated.

When aqueous slurry is to be coexistent with an aqueous phase, there are also cases in the prior art where the slurry is eluted into the aqueous phase thus failing to maintain the initial composition of the slurry. For concrete under water for the purpose of construction in lakes and sea in the field of construction and civil engineering, sufficient segregation resistance under water cannot be achieved by mere addition of the water-soluble polymeric compounds, and thus an alkali metal sulfate is used in combination therewith as shown in JP-B No. 3-38224. However, a reduction in the compression strength of concrete and a significant reduction in the fluidity thereof is caused depending on the amount of the alkali metal salt added, thus making it difficult to produce concrete having stable qualities and high segregation resistance under water. Further, in the case of the grout method of introducing a cement paste having a high water/cement ratio (so-called cement milk) into the ground to condition the ground, there is a problem that the composition of cement milk is made instable when ground water springs out. Further, when the polymeric compound used is a copolymer, there is also a problem that the dispersed state of slurry is easily influenced.

As the technique of using a surfactant to improve fluidity, there is a combination of thickeners for building materials in JP-A No. 7-166150. This is a combination of polymeric nonionic cellulose ethers, which can increase viscosity itself, but cannot attain improvements in bleeding water and segregation resistance under water.

A literature, "Surface" vol. 29, No. 5 (1991) page 61, discloses a viscosity behavior of threadlike micelles of an aqueous solution of cetyltrimethylammonium bromide, mixed with sodium salicylate or salicylic acid.

DISCLOSURE OF THE INVENTION

The object of this invention is to provide a slurry rheology modifier whose solution prepared previously as an aqueous solution has low viscosity thus not causing any problem in operation, shows sufficient viscosity upon kneading in a short time in producing slurry, and gives slurry having a stable segregation resistance, having stable properties or a stable composition even in a high water/powder ratio or upon contacting with an aqueous phase, and being excellent in curing physical properties without delaying coagulation for hydraulic powder.

The present inventors found that the problem described above can be solved by using a slurry rheology modifier comprising two different water-soluble low-molecular compounds satisfying specific properties.

This invention relates to a slurry rheology modifier comprising a first water-soluble low-molecular compound [referred to hereinafter as compound (A)] and a second water-soluble low-molecular compound [referred to hereinafter as compound (B)] different from compound (A), wherein the viscosity of an aqueous solution at 20° C. prepared by mixing an aqueous solution $S_A$ (with a viscosity at 20° C. of 100 mPa·s or less) of compound (A) with an aqueous solution $S_B$ (with a viscosity at 20° C. of 100 mPa·s or less) of compound (B) in the ratio of 50/50 by weight can be at least twice as high as the viscosity of either aqueous solution before mixed.

The invention further provides a slurry rheology modifier comprising the compound (A) and the compound (B) defined above, in which the compound (A) and the compound (B) can form an association product in the form of network in the aqueous solution thereof when the aqueous solution $S_A$ and the aqueous solution $S_B$, defined above, are mixed with each other.

The association product in network includes a trimensional network, a net or network, a sponge structure, fiber structure and a branched structure. The association product network is determined with a scanning type electron microscope. It is network formed by strandlike association product entangling one another as shown in FIG. 4. The length between intersections of the strandlike association product forming network is preferably 0.01 to 100 μm, more preferably 0.05 to 10 μm.

The diameter of the strandlike association product forming network is preferably 0.01 to 2 μm, more preferably 0.05 to 0.5 μm. For this purpose the an instantaneously frozen product of the aqueous solution including (A) and (B) is observed.

With a wide selection of a concentration in the slurry, the content of the compounds (A) and (B) to form the association product network is preferably 0.01 to 50 percent by weight, more preferably 0.01 to 30 percent by weight. The compounds (A) and (B) can be used as above shown.

A magnification of the scanning type electron microscope is that to observe an object sizing in 0.01 to 100 μm, preferably 100 to 10,000 magnification. The length between intersections and the diameter can be determined by taking a picture of an observed image or a hard copy thereof and measuring the length between intersections in strands of the association product network of the picture with a standard scale. The diameter can be determined by measuring the length (width) in the perpendicular direction to the longitudinal direction of strand with a standard scale.

The invention moreover a slurry rheology modifier comprising the compound (A) and the compound (B), defined in Claim 1, which has an SS (suspended solid) concentration in water of 1000 mg/L or less, determined by dropping 30 mL at 20° C. of a slurry including 1 part by weight in total of the effective component of the compound (A) and the effective component of the compound (B) at the weight ratio of the effective component of the compound (A) to the effective component of the compound (B) being (A)/(B)=5/95-95/5, 100 parts by weight of normal Portland cement and 100 parts by weight of water into 500 mL at 20° C. of water in a 500 mL beaker, from the height of 3 cm above the water surface over 15±5 seconds, allowing it to stand for 10 seconds, stirring it for 10 seconds with a mechanical mixer, being of vane type and anchor type having the width and the height of 68 mm×68 mm, fixed at a distance of 1.5 cm between the lower end of the vanes and the inner bottom surface of the beaker, at 60 r.p.m., allowing it to stand for 10 seconds, taking a portion thereof at the depth of 4.5 cm from the water surface and determining the SS concentration of the portion.

The SS concentration is preferably not more than 1000 mg/L, more preferably not more than 500 mg/L, particularly preferably not more than 350 mg/L. The tested slurry is prepared within 2 minutes. Details of the determination of the SS concentration are shown in Example coded by V and IV. The vane stirrer equipped in the beaker is shown in FIG. 2, in which the numerical reference to 1 is a stirring vane, 2 is a 500 mL beaker and the distance between the lower end 1' of the stirring vanes and the inner bottom surface 2' of the beaker is 15 mm.

The water taken above has preferably a turbidity of 30 percent or less, more preferably 6 percent or less. The turbidity can be determined with a calorimeter, Model ND-1001DP, available from Nihon Denshoku Kogyo Co., Ltd., having the length of light-absorbing cell of 10 mm and 12 V 50 W halogen lamp, within 1 minute after taking of the sample. The turbidity may be an index for dispersion together with the SS concentration.

In the slurry to use in determination of the SS concentration and the turbidity, the weight ratio of (A)/(B) as the effective components may be chosen within 5/95 to 95/5. That is, each of them occupies at least 5 percent by weight in the total of (A) and (B).

The invention provides, in addition, a slurry rheology modifier comprising the compound (A) and the compound (B), defined in Claim 1, in which an aqueous solution at 20° C. including 5 parts by weight in total of the effective component of the compound (A) and the effective component of the compound (B) at the weight ratio of the effective component of the compound (A) to the effective component of the compound (B) being (A)/(B)=5/95-95/5, and 95 parts by weight of water meets the following requirement.

<Requirement>
G'min/G'max=0.4~1 in which G'min is the minimum value of modulus of storage elasticity and G'max is the minimum value of modulus of storage elasticity, obtained when the angular velocity ω is in the range of 1~10 rad/s in a cone plate having a diameter of 50 mm, an angle of 0.0398 rad and GAP of 0.0508 mm.

G'min/G'max is more preferably 0.5 to 1, particularly 0.7 to 1. G'min is preferably 1 to 1,000, more preferably 2 to 500, particularly 4 to 100. G'max preferably 2 to 1000,000, more preferably 5 to 500, particularly 10 to 100.

In the slurry to use in determination of the modulus of storage elasticity G', the weight ratio of (A)/(B) as the effective components may be chosen within 5/95 to 95/5. That is, each of them occupies at least 5 percent by weight in the total of (A) and (B). The compounds (A) and (B) can be used as above shown.

It is preferable that the aqueous solution prepared by mixing aqueous solution $S_A$ with aqueous solution $S_B$ in the ratio of 50/50 by weight has an electrical conductance of 0.1 to 80 mS/cm at 20° C.

It is preferable that compound (A) is at least two cationic surfactants having different carbon numbers in the alkyl group from one another.

The invention provides a slurry comprising the slurry rheology modifier described above and a hydraulic slurry comprising the slurry rheology modifier described above, hydraulic powder and water, optionally further including another dispersant. The invention provides a hydraulic composition comprising the slurry described above and aggregates.

The water-soluble low-molecular compound is a compound free of separation from an aqueous phase at room temperature in the state of molecules or structures such as aggregates, micelles, liquid crystals etc. in water or in a mixed state thereof. The phase is referred to as a region having macroscopic dimension whose statistical physical quantities such as temperature, pressure etc. can be clearly defined (Colloid Chemistry, Vol. 1, First Edition, pp. 89-90, published on Oct. 12, 1995 by Tokyo Kagaku Dojin).

The compounds (A) and (B) meet the essential requirements as above shown and then preferably meet at least one of the above shown preferable requirements.

The aqueous solution of compound (A) and the aqueous solution of compound (B) encompass not only materials containing these compounds dissolved therein, but also materials having compound (A) or (B) in the state of structures such as aggregates, micelles, liquid crystals etc. or in a mixed state thereof, which satisfy a viscosity of 100 mPa·s or less. That is, the present invention relates to an aqueous composition comprising compound (A) or (B) such that the viscosity thereof at 20° C. is 100 mPa·s or less.

Further, this invention relates to a process for producing slurry, which comprises adding the slurry rheology modifier of this invention to slurry.

In particular, when the combination of compounds (A) and (B) in the slurry rheology modifier of this invention is selected from (1) combination of compound (A) selected from amphoteric surfactants and compound (B) selected from anionic surfactants, (2) combination of compound (A) selected from cationic surfactants and compound (B) selected from anionic aromatic compounds and (3) combination of compound (A) selected from cationic surfactants and compound (B) selected from brominated compounds, there is provided a process for producing slurry, which comprises adding the slurry rheology modifier to slurry such that the molar ratio of compound (A) to compound (B) as active ingredients, that is, compound (A)/compound (B), is in the range of 1/20 to 20/1, or the sum of compounds (A) and (B) as active ingredients, in terms of the actual concentration thereof in the aqueous phase of slurry, is in the range of 0.01 to 20% by weight.

Further, this invention relates to a process for producing slurry, which comprises preparing slurry containing one compound (A) or (B) for the slurry rheology modifier of this invention, powder and water, and then adding the other compound (A) or (B) to the slurry.

Further, this invention relates to slurry comprising the slurry rheology modifier of this invention and in particular to hydraulic slurry comprising the slurry rheology modifier of this invention, hydraulic powder and water.

The slurry rheology modifier of this invention is characterized in that the viscosity of an aqueous solution of either compound (A) or (B) alone is low in the state of molecules or structures such as aggregates, micelles, liquid crystals etc. or in a mixed state thereof, while a mixture prepared by mixing an aqueous solution of compound (A) with an aqueous solution of compound (B) can have significantly increased viscosity. Accordingly, the requirement of the slurry rheology modifier of this invention is that specific viscosity can be exhibited upon combination of compounds (A) and (B), and the slurry rheology modifier cannot be specified by either compound (A) or (B) alone, but can be specified by only the feature "viscosity is exhibited by mixing compounds (A) and (B)". When the combination of compounds (A) and (B) is specified, either compound can be regarded as compound (A). Hereinafter, when one of the two compounds is referred to as compound (A), the other compound is regarded as compound (B) for convenience' sake.

The aqueous solution of compound (A) or (B) as an essential ingredient in the slurry rheology modifier of this invention has lower viscosity than that of a mixture of aqueous solutions of the two compounds, and the slurry rheology modifier comprising these compounds can be used for significantly improving the operativeness of slurry.

Further, when the slurry rheology modifier of this invention is added to slurry, the rheology of the slurry is improved, and the aqueous phase of the slurry can be thickened in a short time, resulting in a rapid increase in the viscosity of the slurry as a whole.

EMBODIMENTS OF INVENTION

Compounds (A) and (B) used in the slurry rheology modifier of this invention should have the property that when an aqueous solution of compound (A) having a viscosity of 100 mPa·s or less is mixed with an aqueous solution of compound (B) having a viscosity of 100 mPa·s or less, the viscosity thereof can be at least twice as high as the viscosity of either aqueous solution before mixed, and in some cases, the viscosity can be preferably at least 5 times, more preferably 10 times, further preferably at least 100 times and particularly preferably at least 500 times. This viscosity is determined at 20° C. by a Brookfield viscometer (C rotor (No. 3), 1.5 r.p.m. to 12 r.p.m.). Hereinafter, the viscosity is determined under this condition unless otherwise specified. In mixing, the respective aqueous solutions are mixed in the ratio of 50/50 by weight. From the viewpoint of operativeness at the time of adding the slurry rheology modifier of this invention to slurry, the viscosity of each of the aqueous solutions of compounds (A) and (B) at 20° C. is preferably 50 mPa·s or less, more preferably 10 mPa·s or less, and when both the solutions are mixed, the same thickening effect is desirably expressed.

Further, the aqueous solution prepared by mixing the aqueous solutions of compounds (A) and (B) is preferably in the state of molecules or structures such as aggregates, micelles, liquid crystals etc. or in a mixed state thereof at room temperature.

The concentrations of compounds (A) and (B) can be determined in such a range that the viscosity of each of the aqueous solutions of compound (A) and (B) at 20° C. and the viscosity of a mixture thereof satisfy the requirements described above. A preferable range can be also determined when compounds (A) and (B) are specified. Taking it into consideration that the concentrations of compounds (A) and (B) at the time of addition to slurry can be selected in a broad range, it is preferable to select compounds (A) and (B) whose concentrations can be determined in the range of 0.01 to 50% by weight, more preferably 0.1 to 30% by weight.

To permit the slurry rheology modifier of this invention to confer rheological characters on slurry even having high ionic strength, it is preferable that the aqueous solution prepared by mixing the above shown aqueous solution $S_A$ with the above shown aqueous solution $S_B$ in the ratio of 50/50 by weight shows the above-described viscosity even at an electrical conductance at 20° C. of 0.1 to 80 mS/cm, preferably 0.1 to 60 mS/cm and particularly preferably 1 to 40 mS/cm.

To permit the slurry rheology modifier of this invention to confer rheological characters on slurry even having high ionic strength, it is preferable that the mixture of aqueous solutions $S_A$ and $S_B$ contains at least one compound different from compounds (A) and (B), and shows the above-described viscosity even at an electrical conductance at 20° C. of 0.1 to 80 mS/cm, preferably 0.1 to 60 mS/cm and particularly preferably 1 to 40 mS/cm.

Such compounds include electrolytes, and the dissociable ions include e.g. cations such as potassium ion, sodium ion, iron ion, aluminum ion etc. and anions such as hydroxy ion, sulfate ion, chlorine ion etc.

Compounds (A) and (B) may be any combinations whose aqueous solutions satisfy the viscosity defined in this invention, but from the viewpoint of operativeness and dispersion stability of slurry, a combination of compounds (A) and (B) having high molecular weights are not preferable, and compounds (A) and (B) are desirably those having molecular weights of 1000 or less, preferably 700 or less and more preferably 500 or less, or polymers having weight average molecular weights of less than 500, preferably 400 or less and more preferably 300 or less. With this regard the molecular weight of an inorganic compound can be calculated from its chemical formula. That of a polymer can be calculated for example by gel permeation chlomatography/calculation as polyethylene oxide. Preferably, the mixture of aqueous solutions of compounds (A) and (B) at room temperature is free of separation from an aqueous phase in the state of molecules or structures such as aggregates, micelles, liquid crystals etc. or in a mixed state thereof.

The slurry rheology modifier of this invention may make use of any combinations insofar as the aqueous solutions of compounds (A) and (B) satisfy the viscosity defined in this invention, and in a preferable embodiment, the combination of compounds (A) and (B) is selected from (1) combination of a compound selected from amphoteric surfactants and a compound selected from anionic surfactants, (2) combination of a compound selected from cationic surfactants and a compound selected from anionic aromatic compounds and (3) combination of a compound selected from cationic surfactants and a compound selected from brominated compounds.

The compound selected from amphoteric surfactants is preferably a betaine amphoteric surfactant such as dodecanoic acid amide propyl betaine/octadecanoic acid amide propyl betaine/dodecyl dimethyl aminoacetic acid betaine etc., and from the viewpoint of expressing viscosity, dodecanoic acid amide propyl betaine is preferable.

The compound selected from anionic surfactants is preferably an ethylene oxide-added alkyl sulfate surfactant such as POE (3) dodecyl ether sulfate, POE (2) dodecyl ether sulfate, POE (4) dodecyl ether sulfate etc., and the sulfate include e.g. metal sulfates such as sodium sulfate and alkanolamine salts such as triethanolamine salt.

Among these, a combination of dodecanoic acid amide propyl betaine and POE (3) dodecyl ether sulfate triethanolamine or POE (3) dodecyl ether sodium sulfate is preferable. POE is an abbreviation of polyoxyethylene, and the number in the parentheses is indicative of the average number of ethylene oxide molecules added (hereinafter, this definition applies to numbers in parentheses).

The compound selected from cationic surfactants is preferably a quaternary salt type cationic surfactant, and the quaternary salt type cationic surfactant is preferably the one having at least one saturated or unsaturated, linear or branched alkyl group containing 10 to 26 carbon atoms in the structure. For example, the quaternary salt type cationic surfactant includes alkyl ($C_{10-26}$) trimethyl ammonium salt, alkyl ($C_{10-26}$) pyridinium salt, alkyl ($C_{10-26}$) imidazolinium salt, alkyl ($C_{10-26}$) dimethyl benzyl ammonium salt etc., and specific examples thereof include hexadecyl trimethyl ammonium chloride, hexadecyl trimethyl ammonium bromide, octadecyl trimethyl ammonium chloride, octadecyl trimethyl ammonium bromide, tallow trimethyl ammonium chloride, tallow trimethyl ammonium bromide, hydrogenated tallow trimethyl ammonium chloride, hydrogenated tallow trimethyl ammonium bromide, hexadecyl ethyl dimethyl ammonium chloride, octadecyl ethyl dimethyl ammonium chloride, hexadecyl propyl dimethyl ammonium chloride, hexadecyl pyridinium chloride, 1,1-dimethyl-2-hexadecyl imidazolinium chloride, hexadecyl dimethyl benzyl ammonium chloride etc. and these may be used in combination thereof. From the viewpoint of water solubility and thickening effect, hexadecyl trimethyl ammonium chloride (for example, Cortamine 60W produced by Kao Corporation), octadecyl trimethyl ammonium chloride, hexadecyl pyridinium chloride etc. are preferable. From the viewpoint of the temperature stability of the thickening effect, one of compounds (A) and (B) is preferably a combination of two or more cationic surfactants different in the number of carbon atoms in the alkyl group.

In particular, when the slurry rheology modifier of this invention is applied to concrete etc., a quaternary ammonium salt free of halogen such as chlorine is used preferably from the viewpoint of preventing corrosion of reinforced concrete and deterioration of concrete caused by salt damage.

The quaternary salt free of halogen such as chlorine includes ammonium salts, imidazolinium salts etc., and specific examples include hexadecyl trimethyl ammonium methosulfate, hexadecyl dimethyl ethyl ammonium ethosulfate, octadecyl trimethyl ammonium methosulfate, octadecyl dimethyl ethyl ammonium ethosulfate, tallow trimethyl ammonium methosulfate, tallow dimethyl ethyl ammonium ethosulfate, 1,1-dimethyl-2-hexadecyl imidazolinium methosulfate, hexadecyl dimethyl hydroxyethyl ammonium acetate, octadecyl dimethyl hydroxyethyl ammonium acetate, hexadecyl dimethyl hydroxyethyl ammonium propionate, octadecyl dimethyl hydroxyethyl ammonium propionate, tallow dimethyl hydroxyethyl ammonium acetate, tallow dimethyl hydroxyethyl ammonium propionate etc. The quaternary ammonium salt free of halogen such as chlorine can be obtained by quaternarizing e.g. a tertiary amine with dimethyl sulfuric acid or diethyl sulfuric acid.

The compound selected from anionic aromatic compounds includes aromatic ring-containing carboxylic acid or salts thereof, phosphonic acid and salts thereof, and sulfonic acid or salts thereof, and specific examples include salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenol sulfonic acid, m-xylene-4-sulfonic acid, cumene sulfonic acid, methyl salicylic acid, styrene sulfonic acid, chlorobenzoic acid etc., and these acids may have formed salts, and these may be used in combination thereof. When it is a polymer, the weight average molecular weight thereof is preferably less than 500.

The compound selected from brominated compounds is preferably an inorganic salt, and includes NaBr, KBr, HBr etc.

In this invention, compounds (A) and (B) are preferably those easily forming an aggregate because their aqueous thick solution has low viscosity, they show an excellent effect of modifying slurry rheology even at a low concentration of the active ingredients in the rheology modifier in the aqueous phase of slurry, their aqueous thick solution has low viscosity, and operativeness during addition thereof is good. In a particularly preferable combination of compounds (A) and (B) in this invention, compound (A) is selected from quaternary ammonium salt type cationic surfactants while compound (B) is selected from anionic aromatic compounds or brominated compounds, so that thickening of slurry can be achieved by the active ingredients at a very low concentration of 10% by weight or less, the same effect can be brought about even in slurry having high ionic strength, and a certain slurry, particularly upon contacting with an aqueous phase, can achieve very stable segregation resistance, whereby rheological characters which cannot be achieved by conventional thickening agents can be brought about. This is particularly useful for slurry containing hydraulic powder.

Further, the combination wherein compound (A) is an alkyl ($C_{10-26}$) trimethyl ammonium salt and compound (B) is a sulfonate having an aromatic ring is particularly preferable, and the effect is exhibited by the active ingredients even at a concentration of 5% by weight or less in the aqueous phase of slurry. In particular, when the slurry rheology modifier is used in slurry containing hydraulic powder, compound (B) is preferably toluene sulfonic acid, xylene sulfonic acid, cumene sulfonic acid, styrene sulfonic acid or a salt thereof, particularly preferably p-toluene sulfonic acid or a salt thereof, from the viewpoint of prevention of curing retardation.

The slurry rheology modifier of this invention can achieve distinctive slurry rheology characters by using compound (A) in combination with compound (B) which would be attributable to the following reason.

It is estimated that compounds (A) and (B) when mixed with each other can form an aggregate in a short time in an aqueous phase and can confer viscosity efficiently, and formation of this aggregate occurs uniformly in slurry thereby completely capturing an excess of water, to reduce bleeding water with time, whereby slurry having a higher content of water per unit quantity can endowed with properties excellent in segregation resistance.

In particular, when the slurry rheology modifier of this invention comprising a combination of compounds selected from quaternary ammonium salt type cationic surfactants and anionic aromatic compounds or brominated compounds is used, the so-called threadlike micelle aggregates are considered to be formed in an aqueous phase of slurry ["Hyomen"

(Surface), Vol. 29, No. 5 (1991), page 61], to increase the viscosity of the aqueous phase.

The threadlike micelle aggregate is characterized in that when the aqueous phase of slurry undergoes strong internal stress, the structure of the aggregate is destroyed thereby controlling an excess of internal stress, and when the internal stress is thus decreased, the aggregate is formed again to give suitable viscosity to the slurry.

By virtue of such characters, slurry can be produced or transported while preventing generation of an excess of internal friction, whereby the slurry after production or transportation can be endowed with suitable viscosity.

When compound (A) selected from amphoteric surfactants and compound (B) selected from anionic surfactants are used, or when compound (A) selected from cationic surfactants and compound (B) selected from anionic aromatic compounds or brominated compounds are used, the aqueous solution of each compound even in a thick state has low viscosity, and the actual concentration of the aqueous solution before added to slurry can be made preferably 10% by weight or more, more preferably 20% by weight or more, further preferably 30% by weight or more, and most preferably 40% by weight or more, whereby productivity can be improved for example by downsizing storage tanks.

Unless the performance of the slurry rheology modifier of this invention is hindered, this modifier can contain other components such as dispersants, AE agents, retardants, rapid-hardening agents, promoters, frothers, foaming agents, anti-foaming agents, corrosion preventives, coloring agents, anti-fungus agents, cracking reducers, expanding agents, dyes, pigments etc.

Because slurry having modified rheology can be obtained by adding compounds (A) and (B) to slurry, the method of adding the slurry rheology modifier of this invention is not particularly limited, but a preferable method of using the slurry rheology modifier of this invention is described below.

The aqueous solutions of compounds (A) and (B) even in a very low-viscous state can bring about high viscosity when they are mixed, and thus when the slurry rheology modifier of this invention is added to slurry, each solution is used preferably in the form of an aqueous solution having a viscosity of 100 mPa·s or less, preferably 50 mPa·s or less and more preferably 10 mPa·s or less at the temperature used.

In this invention, two compounds whose aqueous solutions having 100 mPa·s or less at 20° C. are mixed in the ratio of 50/50 by weight to give an aqueous solution whose viscosity can be at least twice as high as that of each aqueous solution before mixed are used as the rheology modifier in slurry. According to this invention using such two compounds as compounds (A) and (B), there is provided a method of modifying the rheology of slurry which comprises adding compounds (A) and (B) to slurry. It is possible in this case that one compound (A) or (B) is first added to slurry, and the other compound is then added to the slurry.

From the viewpoint of operativeness, it is preferable that compounds (A) and (B) can be mixed in an arbitrary order with slurry, and thus one of the compounds is added to slurry at a suitable stage, and the other compound is added to the slurry at a stage where viscosity is required. Further, compound (A) or (B) may be in the form of liquid or powder.

From the viewpoint of regulating the hydration reaction of cement particles and preventing foaming in slurry under stirring, it is preferable that when the slurry rheology modifier of this invention comprising a combination of a compound selected from cationic surfactants and a compound selected from anionic aromatic compounds or brominated compounds is used in slurry using hydraulic powder such as cement, the anionic aromatic compound or bromated compound is first added to the slurry and the cationic surfactant is then added thereto.

The slurry rheology modifier of this invention can be specified in terms of viscosity brought about by mixing aqueous solutions of compounds (A) and (B) in the ratio of 50/50 by weight, but when each of compounds (A) and (B) is not a mixture of natural origin (for example, a mixture of compounds derived from tallow) but a single compound, it is preferable from the viewpoint of efficient formation of aggregates between compounds (A) and (B) that compounds (A) and (B) are mixed by specifying the molar ratio thereof.

The molar ratio of compounds (A) and (B) (molar ratio of the active ingredients) in the slurry rheology modifier of this invention for exhibiting a high thickening effect is varied depending the combination of compounds (A) and (B), and may be determined suitably depending on the intended degree of thickening, but particularly when the combination of compounds (A) and (B) is selected from (1) combination of compound (A) selected from amphoteric surfactants and compound (B) selected from anionic surfactants, (2) combination of compound (A) selected from cationic surfactants and compound (B) selected from anionic aromatic compounds and (3) combination of compound (A) selected from cationic surfactants and compound (B) selected from brominated compounds, then the ratio of compounds (A) and (B), i.e. compound (A)/compound (B), is in the range of 1/20 to 20/1, preferably 1/20 to 4/1, more preferably 1/3 to 2/1, particularly preferably 1/1 to 2/3, from the viewpoint of the resultant viscosity and the properties of aggregates.

It is possible to add further either (A) or (B) to the aqueous solution of (A) and (B) having the above shown mole ratio, thereby falling outside the above shown mole ratio, and reduce the viscosity of the solution. Moreover it is also possible to add further the other compound of (A) and (B), falling back within the above shown mole ratio, and again increase the viscosity of the solution.

Further, the slurry rheology modifier of this invention can give good rheology characters to slurry having high ionic strength, and thus it is used preferably in slurry with an aqueous phase having an electrical conductance in the range of 0.01 to 80 mS/cm, preferably 0.1 to 60 mS/cm, particularly preferably 1 to 40 mS/cm. In particular, the slurry rheology modifier of this invention is applied preferably to slurry containing a hydraulic composition such as cement with an aqueous phase having high electrical conductance.

It is preferable that a slurry including the compounds (A) and (B), powder and water is not dispersed out, nor diluted, in water when it has been dropped in water. The dispersion degree can be determined in the following way.

Within 1 minute after the preparation of the slurry, 30 mL at 20° C. of the slurry was dropped into 500 mL at 20° C. of water in a 500 mL beaker having the diameter of 85 mm and the height of 120 mm, from the height of 3 cm above the water surface over 15±5 seconds, then allowing it to stand for 10 seconds, stirring it for 10 seconds at 60 r.p.m. with a mechanical mixer, being of vane type and anchor type having the width and the height of 68 mm×68 mm, HEIDON BL600 of Shinto Kagaku Co., Ltd., the stirring vanes being fixed at a distance of 1.5 cm above the inner bottom surface of the beaker, allowing it to stand for 10 seconds, taking a portion thereof at the depth of 4.5 cm from the water surface as a sample for determining an SS (suspended solid) concentration.

The SS concentration is preferably not more than 1000 mg/L, more preferably not more than 500 mg/L, particularly preferably not more than 350 mg/L. The tested slurry is prepared within 2 minutes. Details of the determination of the SS concentration are shown in Example coded by V and IV. The vane stirrer is shown in FIG. 2, in which the numerical reference to 1 is a stirring vane, 2 is a 500 mL beaker and the distance between the lower end 1' of the stirring vanes and the inner bottom surface 2' of the beaker is 15 mm.

The content of the compounds (A) and (B) in total in the aqueous phase of the slurry, including the compounds (A) and (B) and water, is preferably 0.001 to 30 percent by weight, based on the amount of the fed water, more preferably 0.01 to 15 percent by weight, particularly 0.1 to 10 percent by weight. The weight ratio of (A)/(B) is preferably 5/95 to 95/5, more preferably 20/80 to 80/20. The compounds are used as shown above. The amount of powder is preferably 0.01 to 80 percent by weight, more preferably 25 to 70 percent by weight, in the slurry.

It is preferable that the water taken above meets the above shown SS concentration and then a turbidity of 30 percent or less, more preferably 6 percent or less. The turbidity can be determined with a calorimeter, Model ND-1001DP, available from Nihon Denshoku Kogyo Co., Ltd., having the length of light-absorbing cell of 10 mm and 12 V 50 W halogen lamp, within 1 minute after taking of the sample. The turbidity may be an index for dispersion together with the SS concentration.

It is preferable that the slurry including the compounds (A) and (B), powder and water has the following rheology property, that is, G'min/G'max=0.4~1 in which G'min is the minimum value of modulus of storage elasticity and G'max is the minimum value of modulus of storage elasticity, obtained when the angular velocity ω is in the range of 1~10 rad/s in a cone plate having a diameter of 50 mm, an angle of 0.0398 rad and GAP of 0.0508 mm, with an ARES viscoelasticity meter, made by Rheometric Scientific Co., Ltd. G'min/G'max is more preferably 0.6 to 1, particularly 0.65 to 1. G'min is preferably 4 to 100, 000, more preferably 40 to 50,000, particularly 400 to 10,000. G'max preferably 10 to 100,000, more preferably 100 to 50,000, particularly 1000 to 10,000.

In this case, the content of the compounds (A) and (B) in total in the aqueous phase of the slurry, including the compounds (A) and (B) and water, is preferably 0.001 to 30 percent by weight, based on the amount of the fed water, more preferably 0.01 to 15 percent by weight, particularly 0.1 to 10 percent by weight. The weight ratio of (A)/(B) is preferably 5/95 to 95/5, more preferably 20/80 to 80/20. The compounds are used as shown above. The amount of powder is preferably 0.01 to 80 percent by weight, more preferably 25 to 70 percent by weight, in the slurry.

Compounds (A) and (B) in this invention may be used in the form of either an aqueous solution or powder, and in particular, the slurry rheology modifier of this invention in either form can give good slurry rheological characters. When compounds (A) and (B) are used in the form of powder, operativeness for use in premixing is improved. However, in consideration of adjustment of slurry viscosity, it is preferable that slurry constituent powders such as fillers are not previously surface-treated with compounds (A) and (B).

The slurry rheology modifier of this invention can be applied to slurry having a water/powder ratio of 30 to 300%. The powder used for production of this slurry may be hydraulic powder having physical properties of hardening by hydration reaction. For example, cement and gypsum can be mentioned. Further, fillers can also be used, and examples of fillers include calcium carbonate, fly ash, blast furnace slag, fumed silica, bentonite, clay (natural minerals based on hydrous aluminum silicate: for example kaolinite, halocite etc.). These powders can be used alone or in combination thereof. Further, sand, ballast and mixtures thereof may be added if necessary as aggregate to these powders. Further, the slurry rheology modifier of this invention can also be applied to slurry containing inorganic oxide powders such as titanium oxide other than those described above.

Further, a hydraulic powder composition comprising the slurry rheology modifier of this invention can be prepared by premixing compound (A) and/or compound (B) in this invention with hydraulic powder.

Further, the actual concentration, in slurry, of compounds (A) and (B) in the slurry rheology modifier of this invention may be determined suitably depending on the intended degree of thickening, and slurry containing the slurry rheology modifier of this invention can be obtained by a method of adding the modifier of this invention to previously prepared slurry or adding it at the time of preparing slurry. The effective concentrations in total in the aqueous phase of the slurry of the effective components of the compounds (A) and (B) may be preferably 0.01 to 30% by weight, more preferably 0.1 to 15% by weight.

In particular, a method of adding one compound (A) or (B), powder such as cement, and water to slurry and then adding the other compound (A) or (B) to the slurry is preferable for operativeness. Further, when the combination of compounds (A) and (B) is selected from (1) combination of compound (A) selected from amphoteric surfactants and compound (B) selected from anionic surfactants, (2) combination of compound (A) selected from cationic surfactants and compound (B) selected from anionic aromatic compounds and (3) combination of compound (A) selected from cationic surfactants and compound (B) selected from brominated compounds, the compounds (A) and (B) are used at an actual concentration of preferably 0.01 to 20% by weight, more preferably 0.1 to 15% by weight, further preferably 0.1 to 10% by weight and most preferably 0.3 to 10% by weight in the aqueous phase of slurry.

The hydraulic slurry of this invention may contain a dispersant. The dispersant includes water-reducing agents such as lignin sulfonates and derivatives thereof, oxycarboxylates and polyol derivatives, high-performance water-reducing agents and high-performance AE water-reducing agents such as naphthalene type (Mighty 150 produced by Kao Corporation), melamine type (Mighty 150V-2 produced by Kao Corporation), polycarboxylic acid type (Mighty 3000 produced by Kao Corporation, Reobuild SP produced by NMB Co., Ltd., and Aquarock FC600 and Aquarock FC900 produced by Nippon Shokubai Co., Ltd.), and anionic surfactants such as polycarboxylic acid type surfactants (Poise series produced by Kao Corporation). Among these, the polycarboxylic acid type high-performance water-reducing agents and polycarboxylic acid type surfactants are preferably used because they can achieve both the fluidity and viscosity of slurry.

The content of the dispersant in the hydraulic slurry of this invention, in terms of the content of the active ingredient thereof in hydraulic powder, is generally 0.01 to 5% by weight, preferably 0.05 to 3% by weight.

Compounds (A) and (B) in this invention can be used in combination with other existing thickening agents. The other existing thickening agents include e.g. cellulose derivatives, polyacrylic polymers, polyethylene oxide, polyvinyl alcohol, gum type polysaccharides, polysaccharides fermented by microorganisms, etc.

Unless the performance of the slurry rheology modifier of this invention is hindered, this slurry rheology modifier may contain other components such as AE agents, retardants, rapid-hardening agents, promoters, frothers, foaming agents, anti-foaming agents, cracking reducers, expanding agents etc.

The hydraulic slurry of this invention can be mixed with aggregate to prepare a hydraulic composition. A cured composition formed by curing this hydraulic composition is excellent in initial curing physical properties, and can be used preferably in fillers and structures.

As the aggregate mixed with the hydraulic slurry of this invention, small aggregate and coarse aggregate can be used, and are not particularly limited, but high-strength aggregate having low water absorption is preferable. The coarse aggregate includes ballast from river, land, mountain or sea, lime ballast, rubble thereof, blast furnace slug coarse aggregate, ferronickel slug coarse aggregate, (artificial and natural) light-weight coarse aggregate, and regenerated aggregate. The fine aggregate includes ballast from river, land, mountain or sea, lime ballast, borax, rubble thereof, blast furnace slug fine aggregate, ferronickel slug fine aggregate, (artificial and natural) light-weight coarse aggregate, and regenerated aggregate.

The slurry rheology modifier of this invention exhibits sufficient viscosity upon kneading in a short time to endow slurry with viscosity, and even if it is prepared previously as an aqueous solution, the viscosity of the aqueous solution is low and the operativeness is good. Further, slurry comprising this slurry rheology modifier is highly resistant to water and hardly undergoes segregation of material under water.

EXAMPLES

Example 1

(1) Compounds (A) and (B) in Table 1 were used to prepare aqueous solutions at concentrations regulated to have the viscosity at 20° C. as shown in Table 2, whereby aqueous solutions A and B were prepared. In the Examples and Comparative Examples, the compounds in Table 1 were also used. The compounds in Table 1 were used to prepare aqueous solutions for evaluation at the concentrations in Table 1, and the density of each aqueous solution was measured. The results are collectively shown in Table 1, and from the relationship between the concentration of the aqueous solution and the density of the aqueous solution, the viscosity of every prepared aqueous solution (Table 2) prepared in this example was made 1.0 (g/cm$^3$).

(2) 100 ml (100 g) each of aqueous solutions A and B prepared in (1) were mixed in the combination shown in Table 2, and stirred for 10 seconds with a stirrer equipped with a stirring blade to prepare a mixed solution (A+B), and the viscosity thereof at 20° C. was measured. The results are shown in Table 2.

The viscosity was determined by a Brookfield viscometer (DVM-B, C rotor, 1.5 r.p.m. to 12 r.p.m., Tokyo Keiki). The electrical conductance was determined by a conductivity meter DS-15 manufactured by Horiba.

(3) In Comparative Examples 1 to 3, aqueous solutions were prepared as aqueous solutions A wherein the concentrations of Comparative Products 1 to 3 were regulated such that the solutions when diluted with an equal volume of water (substitute for aqueous solution B) gave the same viscosity as in the mixed solution (A+B) in the Examples in Table 2.

TABLE 1

| No. | | Compound | Concentration of compound (weight %) | Density of aqueous solution (g/cm$^3$) |
|---|---|---|---|---|
| Compound(A) | A-1 | Hexadecyl trimethyl ammonium chloride (Trade name: Cortamine 60W, produced by Kao Corporation) | 30 | 0.98 |
| | A-2 | Octadecyl trimethyl ammonium chloride | 30 | 0.97 |
| | A-3 | Hexadecyl pyridinium chloride | 30 | 0.96 |
| | A-4 | Dodecanoic acid amide propyl betaine (Trade name: Anhitol 20AB, produced by Kao Corporation) | 30 | 1.06 |
| | A-5 | Hexadecyl dimethyl ethyl ammonium sulfate | 30 | 0.97 |
| | A-6 | Octadecyl trimethyl ammonium methosulfate | 30 | 0.96 |
| | A-7 | Hexadecyl dimethyl hydroxyethyl ammonium acetate | 30 | 0.96 |
| | A-8 | A-1/A-2 = 50/50(ratio by weight) | 30 | 0.98 |
| Compound(B) | B-1 | Sodium salicylate | 10 | 1.05 |
| | B-2 | Sodium p-toluenesulfonate | 20 | 1.09 |
| | B-3 | m-xylene-4-sulfonate | 20 | 1.05 |
| | B-4 | NaBr | 10 | 1.09 |
| | B-5 | POE(3) dodecyl ether sodium sulfate (Trade name: Emal 20C, produced by Kao Corporation) | 25 | 1.06 |
| | B-6 | POE(2) dodecyl ether sodium sulfate (Trade name: Emal 27C.produced by Kao Corporation) | 27 | 1.05 |
| Comparative products | 1 | Polyoxyethylene | — | — |
| | 2 | Carboxymethyl cellulose (Trade name: CMC2260, produced by Daicel Chemical Industries, Ltd.) | — | — |
| | 3 | Methyl cellulose (Metrose SM-30000, produced by Shin-Etsu Chemical Co., Ltd.) | — | — |

TABLE 2

| | | Aqueous solution A Compound (A) | | | Aqueous solution B Compound (B) | | | Mixed solution (A + B) | |
|---|---|---|---|---|---|---|---|---|---|
| | | Type | Concentration (weight %) | Viscosity (20° C./mPa · s) | Type | Concentration (weight %) | Viscosity (20° C./mPa · s) | Concentration (weight %) | Viscosity (20° C./mPa · s) |
| Examples | 1-1 | A-1 | 2.7 | 5 | B-1 | 1.4 | 1 | 2.05 | 4600 |
| | 1-2 | A-2 | 1.3 | 3 | B-2 | 0.8 | 1 | 1.05 | 1200 |
| | 1-3 | A-3 | 2.0 | 3 | B-3 | 1.3 | 1 | 1.65 | 2900 |
| | 1-4 | A-4 | 24.0 | 15 | B-5 | 16 | 5 | 20.0 | 1900 |
| | 1-5 | A-1 | 5.0 | 7 | B-4 | 0.4 | 1 | 2.7 | 800 |
| | 1-6 | A-3 | 3.0 | 4 | B-2 | 1.72 | 1 | 2.36 | 3900 |
| | 1-7 | A-1 | 0.25 | 1 | B-2 | 0.15 | 1 | 0.20 | 8 |
| | 1-8 | A-4 | 10.0 | 5 | B-6 | 24.5 | 80 | 17.3 | 31600 |
| | 1-9 | A-5 | 2.70 | 5 | B-2 | 1.24 | 1 | 1.97 | 4200 |
| | 1-10 | A-6 | 1.30 | 3 | B-3 | 0.64 | 1 | 0.97 | 1100 |
| | 1-11 | A-7 | 2.60 | 5 | B-1 | 1.04 | 1 | 1.82 | 2800 |
| | 1-12 | A-8 | 2.7 | 5 | B-1 | 1.4 | 1 | 2.05 | 4800 |
| | 1-13 | A-8 | 1.3 | 3 | B-2 | 0.8 | 1 | 1.05 | 1100 |
| | 1-14 | A-8 | 2.0 | 4 | B-3 | 1.3 | 1 | 2.65 | 3000 |
| Comparative Examples | 1-1 | Comparative product 1 | 1.6 | 20000 | water | 0 | 1 | 0.8 | 1100 |
| | 1-2 | Comparative product 2 | 2.0 | 40000 | water | 0 | 1 | 1.0 | 3100 |
| | 1-3 | Comparative product 3 | 2.0 | 30000 | water | 0 | 1 | 1.0 | 2000 |
| | 1-4 | A-1 | 5.0 | 7 | glucose | 1.9 | 1 | 3.45 | 3 |
| | 1-5 | Maleic acid | 2.8 | 1 | B-5 | 10 | 4 | 6.40 | 2 |

The electrical conductance of the mixed solution (A + B) at 20° C. was 2 to 8 mS/cm in Examples 1-1, 1-2, 1-3, 1-5, 1-6, 1-7, 1-9, 1-10, and 1-11, and 26-40 mS/cm in Examples 1-4 and 1-8.

(Note)

The electrical conductance of the mixed solution (A+B) at 20° C. was 2 to 8 mS/cm in Examples 1-1, 1-2, 1-3, 1-5, 1-6, 1-7, 1-9, 1-10, and 1-11, and 26-40 mS/cm in Examples 1-4 and 1-8.

Example 2

The same measurement as in Example 1 was conducted except that a solution prepared by dissolving sodium hydroxide at a concentration of 0.6% by weight in aqueous solution B as shown in Table 3 was used. The results are shown in Table 3.

TABLE 3

| | | Aqueous solution A Compound (A) | | | Aqueous solution B Compound (B) | | | Mixed solution (A + B) | |
|---|---|---|---|---|---|---|---|---|---|
| | | type | Concentration (weight %) | Viscosity (20° C./mPa · s) | type | Concentration (weight %) | Viscosity (20° C./mPa · s) | Concentration (weight %) | Viscosity (20° C./mPa · s) |
| Examples | 2-1 | A-1 | 2.7 | 5 | B-1 | 2.0 | 2 | 2.4 | 4900 |
| | 2-2 | A-2 | 1.3 | 3 | B-2 | 1.4 | 2 | 1.4 | 1300 |
| | 2-3 | A-3 | 2.0 | 3 | B-3 | 1.9 | 2 | 2.0 | 3100 |
| | 2-4 | A-4 | 24 | 15 | B-5 | 16.6 | 6 | 20.3 | 600 |
| | 2-5 | A-1 | 2.7 | 5 | B-2 | 2.4 | 2 | 2.6 | 5000 |
| | 2-6 | A-1 | 3.0 | 6 | B-4 | 1.6 | 1 | 2.3 | 500 |
| | 2-7 | A-2 | 2.0 | 4 | B-1 | 1.6 | 2 | 1.8 | 3400 |
| | 2-8 | A-2 | 5.0 | 5 | B-3 | 1.4 | 2 | 3.2 | 800 |
| | 2-9 | A-3 | 2.0 | 3 | B-2 | 1.8 | 2 | 1.9 | 3100 |
| | 2-10 | A-1 | 0.25 | 1 | B-2 | 0.75 | 1 | 0.5 | 10 |
| | 2-11 | A-4 | 10.0 | 5 | B-6 | 25.1 | 98 | 17.6 | 31900 |
| | 2-12 | A-5 | 2.70 | 5 | B-2 | 1.84 | 1 | 2.27 | 4400 |
| | 2-13 | A-6 | 1.30 | 3 | B-3 | 1.24 | 1 | 1.27 | 1200 |
| | 2-14 | A-7 | 2.60 | 5 | B-1 | 1.64 | 1 | 2.12 | 3000 |
| | 2-15 | A-8 | 2.7 | 5 | B-1 | 2.0 | 2 | 2.4 | 5000 |
| | 2-16 | A-8 | 1.3 | 3 | B-2 | 1.4 | 2 | 1.4 | 1200 |
| | 2-17 | A-8 | 2.0 | 4 | B-3 | 1.9 | 2 | 2.0 | 3200 |
| Comparative examples | 2-1 | Comparative product 1 | 1.6 | 20000 | water + NaOH | 0.6 | 1 | 1.1 | 800 |
| | 2-2 | Comparative product 2 | 2.0 | 40000 | water + NaOH | 0.6 | 1 | 1.3 | 2400 |
| | 2-3 | Comparative product 3 | 2.0 | 30000 | water + NaOH | 0.6 | 1 | 1.3 | 1700 |
| | 2-4 | A-1 | 5.0 | 7 | glucose | 2.5 | 1 | 3.8 | 5 |
| | 2-5 | Maleic acid | 2.8 | 1 | B-5 | 10.6 | 15 | 6.7 | 3 |

(Note)

The concentration of aqueous solution (B) in Examples 2-1 to 2-9 and Comparative Examples 2-4 to 2-5 is the total concentration of 0.6% by weight of sodium hydroxide and the amount of compound (B).

The electrical conductance of the mixed solution (A+B) at 20° C. was 32 to 38 mS/cm in Examples 2-1, 2-2, 2-3, 2-5, 2-6, 2-7, 2-8, 2-9, 2-10, 2-12, 2-13 and 2-14, 56 to 70 mS/cm in Examples 2-4 and 2-11, and 30 to 34 mS/cm in Comparative Examples 2-1 to 2-5.

Examples 3 to 13 and Comparative Examples 3 to 5, 10, and 13

(1) Slurry Formulation

Slurry having each formulation shown in Table 4 was prepared. Formulation I was used in Example 3 and Comparative Example 3 (Table 5). Similarly, formulations II to XI were used in Example 4, Comparative Example 4 (Table 6) to Example 13 and Comparative Example 13 (Table 15).

TABLE 4

| | | Tap Water(W) (g) | Fine powder(P) | | | W/P (%) |
|---|---|---|---|---|---|---|
| | | | Type | specific gravity | (g) | |
| Formulation | I | 120 | Titanium oxide (rutile type) | 4.2 | 200 | 60 |
| | II | 140 | Normal portland cement | 3.16 | 200 | 70 |
| | III | 90 | Normal portland cement | 3.16 | 200 | 45 |
| | IV | 200 | Blast furnace slag | 2.89 | 200 | 100 |
| | V | 120 | Fly ash | 2.20 | 200 | 60 |
| | VI | 120 | Calcium carbonate | 2.71 | 200 | 60 |
| | VII | 300 | Fumed silica | 2.20 | 200 | 150 |
| | VIII | 600 | Bentonite | 2.60 | 200 | 300 |
| | IX | 300 | Soil | 1.30 | 200 | 150 |
| | X | 300 | Black soil | 1.60 | 200 | 150 |
| | XI | 500 | Normal Portland cement | 3.16 | 113 | 250 |
| | | | Bentonite | 2.60 | 87 | |

(2) Preparation of Slurry

In Examples and Comparative Examples 3-5, 3-6, 4-8, 4-9, 5-5, 5-6, 10-5, 10-6, 13-5 and 13-6, fine powder, water and compound (B) were previously kneaded for 30 seconds, then compound (A) was added thereto, and the mixture was kneaded until the fluidity became constant.

In other comparative examples, fine powder and water were previously mixed, and a comparative compound was added thereto and kneaded until the fluidity became constant. Thereafter, the same operation as in the Examples was conducted.

Formulation I was kneaded using a homomixer, and the other formulations were kneaded using a mortar mixer. Preparation of slurry was conducted at 20° C.

Slurry thus prepared was evaluated for 5 items, that is, kneading time, slurry flow value, slurry viscosity, segregation resistance under water, and amount of bleeding water shown below. For formulations II, III and XI (Tables 6, 7 and 15), hydration rate was also measured.

(3) Evaluation (3-1) Slurry Flow Values

After the slurry prepared was packed in a cylindrical cone of 45 mm in height and 45 mm in inner diameter, the cone was raised gently vertically. The diameter (mm) of the completely spread slurry was measured.

(3-2) Kneading Time

Slurry consisting of fine powder such as cement and water only lost fluidity upon addition of compound (A) or a comparative kneading agent, and the time when the fluidity became constant with stirring thereafter was judged visually (with naked eyes). The evaluation criteria are shown below.
◉ 5 seconds or less
○ 5 to 10 seconds
Δ 10 to 30 seconds
X 30 seconds to 2 minutes (3-3) Slurry Viscosity (Pa's)

The prepared slurry was charged into a sample container under the conditions of an external tube φ27 mm, an internal tube φ14 mm and sample height 65 mm, and an internal cylindrical rotary rheometer (RM260 Rheometer, produced by Mettler) (external tube diameter 27 mm; internal tube diameter 25 mm; sample height 65 mm) was used to increase the shear rate of the slurry in the internal tube exponentially to 30 $sec^{-1}$ in 30 seconds, and the viscosity at 20° C. was determined by Bingham approximation at a shear rate of 0.5 to 3.0 $sec^{-1}$.

(3-4) Segregation Resistance Under Water 10 g of the prepared slurry was taken and gently was allowed to settle gently in 400 ml tap water in a 500 ml beaker. The state of the slurry stirred up in water was evaluated visually (with naked eyes). The evaluation criteria are shown below.
◉ The aqueous phase is completely transparent, and the whole of the settled slurry can be confirmed.
○ The whole of the slurry settled in the bottom can be confirmed.
Δ The aqueous phase is turbid, but a part of the slurry settled in the bottom of the beaker can be seen.
X The aqueous phase is turbid, and the bottom of the beaker cannot be seen.

(3-5) Amount of Bleeding Water 200 g of the prepared slurry was placed in a 500 ml beaker and left for 30 minutes, and the bleeding water appearing on the surface was sucked up with a syringe and weighed. The evaluation criteria are shown below:
◉ Amount of bleeding water, 0 g (none)
○ Amount of bleeding water, 0 g to 1 g
Δ Amount of bleeding water, 1 g to 5 g
X Amount of bleeding water, 5 g or more The above results are shown in Tables 5 to 15. The addition amounts in Tables 5 to 15 are indicative of the total concentration (weight %) of compounds (A) and (B) in the aqueous phase of slurry in formulations in Table 4.

(3-6) Hydration Rate 20 g of the prepared slurry was set in a calorimeter (Twin Conduction Micro Calorimeter Model TCC-2-6, produced by Tokyo Riko Co.), and a second hydration exothermic peak time was measured. The evaluation criteria are shown below.

The results are shown in Tables 6, 7 and 15.
◎ 5 hours to 15 hours
○ 15 hours to 25 hours
Δ 25 hours to 35 hours
X 35 hours or more

TABLE 5

|  |  | Compound (A) | Compound (B) | (A)/(B) molar ratio | Addition amount (%) | Slurry flow value (mm) | Kneading time | Slurry viscosity (Pa·s) | Segregation resistance under water | amount of bleeding water |
|---|---|---|---|---|---|---|---|---|---|---|
| Examples | 3-1 | A-1 | B-1 | 4/1 | 2.14 | 172 | ◎ | 2.9 | ○ | ○ |
|  | 3-2 | A-1 | B-4 | 4/1 | 3.57 | 141 | ◎ | 10.7 | ◎ | ○ |
|  | 3-3 | A-3 | B-2 | 1/1 | 4.28 | 139 | ◎ | 14.5 | ○ | ◎ |
|  | 3-4 | A-1 | B-2 | 1/1 | 0.5 | 132 | ◎ | 11.1 | ◎ | ◎ |
|  | 3-5 | A-4 | B-6 | 1/2.2 | 17.3 | 121 | ○ | 45.0 | ○ | ○ |
|  | 3-6 | A-8 | B-2 | 1/1 | 0.5 | 129 | ◎ | 11.9 | ◎ | ◎ |
|  | 3-7 | A-8 | B-1 | 1/1 | 2.14 | 130 | ◎ | 12.3 | ◎ | ◎ |
|  | 3-8 | A-8 | B-3 | 1/1 | 2.14 | 132 | ◎ | 12.1 | ◎ | ◎ |
| Comparative examples | 3-1 | not added | not added | — | — | 320 | ◎ | 0.09 | X | X |
|  | 3-2 | Comparative product 1 | not added | — | 3.57 | 192 | X | 1.8 | Δ | Δ |
|  | 3-3 | Comparative product 2 | not added | — | 3.57 | 163 | X | 6.6 | X | Δ |
|  | 3-4 | Comparative product 3 | not added | — | 3.57 | 150 | X | 10.3 | Δ | Δ |
|  | 3-5 | A-1 | glucose | 1/1 | 4.28 | 317 | ◎ | 0.10 | X | X |
|  | 3-6 | Maleic acid | B-5 | 1/1 | 4.28 | 315 | ◎ | 0.09 | X | X |

Table 5 shows the results where slurry formulation I was used.
(Note)
Table 5 shows the results where slurry formulation I was used.

Because Comparative Examples 3-1, 3-5 and 3-6 did not show thickening properties, the slurry had a high slurry value without segregation resistance.

The electrical conductance at 20° C. of the slurry to which each compound was added was 2 to 10 mS/cm in all the Examples and Comparative Examples.

TABLE 6

|  |  | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water | Hydration rate |
|---|---|---|---|---|---|---|---|---|---|---|---|
| Examples | 4-1 | A-1 | B-1 | 1/1 | 4.28 | 131 | ◎ | 45.0 | ◎ | ◎ | ○ |
|  | 4-2 | A-1 | B-1 | 1/1 | 2.00 | 180 | ◎ | 32.1 | ◎ | ◎ | ○ |
|  | 4-3 | A-1 | B-1 | 4/1 | 1.14 | 190 | ◎ | 14.0 | ○ | ○ | ○ |
|  | 4-4 | A-1 | B-1 | 1/3 | 3.57 | 124 | ◎ | 42.2 | ◎ | ◎ | ○ |
|  | 4-5 | A-1 | B-2 | 1/1 | 2.14 | 152 | ◎ | 35.9 | ◎ | ◎ | ◎ |
|  | 4-6 | A-1 | B-4 | 1/1 | 2.43 | 165 | ◎ | 29.5 | ◎ | ○ | ○ |
|  | 4-7 | A-2 | B-1 | 1/1 | 2.86 | 133 | ◎ | 44.7 | ◎ | ◎ | ○ |
|  | 4-8 | A-2 | B-3 | 4/1 | 0.71 | 177 | ◎ | 13.1 | ○ | ○ | ◎ |
|  | 4-9 | A-3 | B-2 | 1/1 | 1.43 | 154 | ◎ | 31.6 | ○ | ◎ | ◎ |
|  | 4-10 | A-1 | B-2 | 1/1 | 0.5 | 160 | ◎ | 33.9 | ◎ | ◎ | ◎ |
|  | 4-11 | A-4 | B-6 | 1/2.2 | 17.3 | 119 | ○ | 47.2 | ○ | ○ | ○ |
|  | 4-12 | A-5 | B-2 | 1/1 | 2.43 | 128 | ◎ | 31.5 | ◎ | ◎ | ◎ |
|  | 4-13 | A-6 | B-3 | 1/1 | 4.28 | 113 | ◎ | 42.3 | ◎ | ◎ | ◎ |
|  | 4-14 | A-7 | B-1 | 1/1 | 1.55 | 141 | ◎ | 18.9 | ○ | ○ | ○ |
|  | 4-15 | A-8 | B-2 | 1/1 | 2.86 | 132 | ◎ | 45.1 | ◎ | ◎ | ◎ |
|  | 4-16 | A-8 | B-3 | 1/1 | 4.28 | 114 | ◎ | 42.5 | ◎ | ◎ | ◎ |
|  | 4-17 | A-8 | B-1 | 1/1 | 4.28 | 130 | ◎ | 44.8 | ◎ | ◎ | ○ |
| Comparative examples | 4-1 | not added | not added | — | — | 280 | ◎ | 0.40 | X | X | ○ |
|  | 4-2 | Comparative product 1 | not added | — | 0.14 | 244 | Δ | 2.3 | X | X | Δ |
|  | 4-3 | Comparative product 1 | not added | — | 2.43 | 126 | X | 18.9 | ○ | Δ | X |
|  | 4-4 | Comparative product 2 | not added | — | 0.14 | 203 | X | 8.2 | X | X | Δ |
|  | 4-5 | Comparative product 2 | not added | — | 2.43 | 150 | X | 27.1 | Δ | X | X |
|  | 4-6 | Comparative product 3 | not added | — | 0.14 | 209 | Δ | 11.6 | X | X | X |

TABLE 6-continued

|   | | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water | Hydration rate |
|---|---|---|---|---|---|---|---|---|---|---|---|
| | 4-7 | Comparative product 3 | not added | — | 2.43 | 177 | X | 30.8 | ○ | ○ | X |
| | 4-8 | A-1 | glucose | 1/1 | 3.57 | 279 | ◎ | 0.41 | X | X | X |
| | 4-9 | Maleic acid | B-5 | 1/1 | 3.57 | 271 | ◎ | 0.35 | X | X | X |

Table 6 shows the results where slurry formulation II was used.
(Note)
Table 6 shows the results where slurry formulation II was used.

Because Comparative Examples 4-1, 4-8 and 4-9 did not show thickening properties, the slurry had a high slurry value without segregation resistance.

The electrical conductance at 20° C. of the slurry to which each compound was added was 25 to 33 mS/cm in all the Examples and Comparative Examples.

TABLE 7

| | | Compound (A) | Compound (B) | (A)/(B) molar ratio | Addition mount (%) | Slurry flow value (mm) | Kneading time | Slurry viscosity (Pa·s) | Segregation resistance under water | Amount of bleeding water | Hydration rate |
|---|---|---|---|---|---|---|---|---|---|---|---|
| Examples | 5-1 | A-1 | B-1 | 1/1 | 4.28 | 95 | ◎ | 57 | ◎ | ◎ | ○ |
| | 5-2 | A-1 | B-4 | 1/1 | 2.43 | 120 | ◎ | 47.5 | ◎ | ◎ | ○ |
| | 5-3 | A-1 | B-4 | 4/1 | 2.43 | 134 | ◎ | 39.5 | ◎ | ◎ | ○ |
| | 5-4 | A-3 | B-2 | 1/1 | 1.43 | 111 | ◎ | 43.3 | ◎ | ◎ | ◎ |
| | 5-5 | A-1 | B-2 | 1/1 | 0.5 | 115 | ◎ | 38.7 | ◎ | ◎ | ◎ |
| | 5-6 | A-4 | B-6 | 1/2.2 | 17.3 | 83 | ○ | 63.2 | ◎ | ◎ | ○ |
| | 5-7 | A-5 | B-2 | 1/1 | 2.43 | 117 | ◎ | 46.6 | ◎ | ◎ | ◎ |
| | 5-8 | A-6 | B-3 | 1/1 | 4.28 | 109 | ◎ | 54.3 | ◎ | ◎ | ◎ |
| | 5-9 | A-7 | B-1 | 1/1 | 1.55 | 128 | ◎ | 44.7 | ◎ | ◎ | ○ |
| | 5-10 | A-8 | B-2 | 1/1 | 2.43 | 121 | ◎ | 48.1 | ◎ | ◎ | ◎ |
| | 5-11 | A-8 | B-3 | 1/1 | 4.28 | 108 | ◎ | 54.4 | ◎ | ◎ | ◎ |
| | 5-12 | A-8 | B-1 | 1/1 | 1.55 | 130 | ◎ | 44.5 | ◎ | ◎ | ○ |
| Comparative examples | 5-1 | not added | not added | — | — | 246 | ◎ | 0.81 | X | X | ○ |
| | 5-2 | Comparative product 1 | not added | — | 2.43 | 200 | X | 22.6 | ○ | Δ | X |
| | 5-3 | Comparative product 2 | not added | — | 2.43 | 166 | X | 24.6 | Δ | X | X |
| | 5-4 | Comparative product 3 | not added | — | 2.43 | 150 | X | 33.0 | ○ | ◎ | X |
| | 5-5 | A-1 | glucose | 1/1 | 4.28 | 245 | ◎ | 0.79 | X | X | X |
| | 5-6 | Maleic acid | B-5 | 1/1 | 4.28 | 246 | ◎ | 0.80 | X | X | X |

Table 7 shows the results where slurry formulation III was used.
(Note)
Table 7 shows the results where slurry formulation III was used.

Because Comparative Examples 5-1, 5-5 and 5-6 did not show thickening properties, the slurry had a high slurry value without segregation resistance.

The electrical conductance at 20° C. of the slurry to which each compound was added was 35 to 40 mS/cm in all the Examples and Comparative Examples.

TABLE 8

| | | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water |
|---|---|---|---|---|---|---|---|---|---|---|
| Examples | 6-1 | A-1 | B-1 | 1/1 | 4.28 | 145 | ◎ | 42.7 | ◎ | ◎ |
| | 6-2 | A-1 | B-4 | 1/1 | 2.43 | 170 | ◎ | 25.5 | ◎ | ◎ |
| | 6-3 | A-1 | B-4 | 4/1 | 2.43 | 185 | ◎ | 20.1 | ◎ | ○ |
| | 6-4 | A-3 | B-2 | 1/1 | 1.43 | 166 | ◎ | 22.6 | ◎ | ◎ |
| | 6-5 | A-1 | B-2 | 1/1 | 0.5 | 161 | ◎ | 24.3 | ◎ | ◎ |
| | 6-6 | A-4 | B-6 | 1/2.2 | 17.3 | 133 | ○ | 46.1 | ◎ | ◎ |
| | 6-7 | A-5 | B-2 | 1/1 | 2.43 | 169 | ◎ | 24.2 | ◎ | ◎ |
| | 6-8 | A-6 | B-3 | 1/1 | 4.28 | 146 | ◎ | 41.0 | ◎ | ◎ |
| | 6-9 | A-7 | B-1 | 1/1 | 1.55 | 155 | ◎ | 23.0 | ◎ | ◎ |
| | 6-10 | A-8 | B-2 | 1/1 | 2.43 | 142 | ◎ | 30.3 | ◎ | ◎ |

TABLE 8-continued

|  |  | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water |
|---|---|---|---|---|---|---|---|---|---|---|
|  | 6-11 | A-8 | B-3 | 1/1 | 4.28 | 147 | ◎ | 41.5 | ◎ | ◎ |
|  | 6-12 | A-8 | B-1 | 1/1 | 1.55 | 150 | ◎ | 24.2 | ◎ | ◎ |

Table 8 shows the results where slurry formulation IV was used.
(Note)
Table 8 shows the results where slurry formulation IV was used.
The electrical conductance at 20° C. of the slurry to which each compound was added was 2.5 to 3.5 mS/cm in all the Examples.

TABLE 9

|  |  | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water |
|---|---|---|---|---|---|---|---|---|---|---|
| Examples | 7-1 | A-1 | B-1 | 1/1 | 4.28 | 187 | ◎ | 25.6 | ◎ | ◎ |
|  | 7-2 | A-1 | B-4 | 1/1 | 2.43 | 211 | ◎ | 15.6 | ◎ | ◎ |
|  | 7-3 | A-1 | B-4 | 4/1 | 2.43 | 225 | ◎ | 10.9 | ○ | ○ |
|  | 7-4 | A-3 | B-2 | 1/1 | 1.43 | 198 | ◎ | 13.3 | ◎ | ◎ |
|  | 7-5 | A-1 | B-2 | 1/1 | 0.5 | 200 | ◎ | 12.1 | ◎ | ◎ |
|  | 7-6 | A-4 | B-6 | 1/2.2 | 17.3 | 178 | ◎ | 39.2 | ◎ | ◎ |
|  | 7-7 | A-5 | B-2 | 1/1 | 2.43 | 209 | ◎ | 14.2 | ◎ | ◎ |
|  | 7-8 | A-6 | B-3 | 1/1 | 4.28 | 169 | ◎ | 25.5 | ◎ | ◎ |
|  | 7-9 | A-7 | B-1 | 1/1 | 1.55 | 194 | ◎ | 13.2 | ◎ | ◎ |
|  | 7-10 | A-8 | B-1 | 1/1 | 4.28 | 180 | ◎ | 27.9 | ◎ | ◎ |
|  | 7-11 | A-8 | B-2 | 1/1 | 2.43 | 200 | ◎ | 16.3 | ◎ | ◎ |
|  | 7-12 | A-8 | B-3 | 1/1 | 4.28 | 160 | ◎ | 27.5 | ◎ | ◎ |

Table 9 shows the results where slurry formulation V was used.
(Note)
Table 9 shows the results where slurry formulation V was used.
The electrical conductance at 20° C. of the slurry to which each compound was added was 3.8 to 4.5 mS/cm in all the Examples.

TABLE 10

|  |  | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water |
|---|---|---|---|---|---|---|---|---|---|---|
| Examples | 8-1 | A-1 | B-1 | 1/1 | 4.28 | 176 | ◎ | 26.6 | ◎ | ◎ |
|  | 8-2 | A-1 | B-4 | 1/1 | 2.43 | 201 | ◎ | 17.3 | ◎ | ◎ |
|  | 8-3 | A-1 | B-4 | 4/1 | 2.43 | 213 | ◎ | 11.9 | ○ | ○ |
|  | 8-4 | A-3 | B-2 | 1/1 | 1.43 | 187 | ◎ | 14.1 | ◎ | ◎ |
|  | 8-5 | A-1 | B-2 | 1/1 | 0.5 | 200 | ◎ | 13.1 | ◎ | ◎ |
|  | 8-6 | A-4 | B-6 | 1/2.2 | 17.3 | 165 | ◎ | 40.7 | ◎ | ◎ |
|  | 8-7 | A-5 | B-2 | 1/1 | 2.43 | 208 | ◎ | 16.2 | ◎ | ◎ |
|  | 8-8 | A-6 | B-3 | 1/1 | 4.28 | 170 | ◎ | 25.4 | ◎ | ◎ |
|  | 8-9 | A-7 | B-1 | 1/1 | 1.55 | 181 | ◎ | 13.4 | ◎ | ◎ |
|  | 8-10 | A-8 | B-1 | 1/1 | 1.55 | 179 | ◎ | 17.2 | ◎ | ◎ |
|  | 8-11 | A-8 | B-2 | 1/1 | 2.43 | 200 | ◎ | 18.3 | ◎ | ◎ |
|  | 8-12 | A-8 | B-3 | 1/1 | 4.28 | 160 | ◎ | 29.6 | ◎ | ◎ |

Table 10 shows the results where slurry formulation VI was used.
(Note)
Table 10 shows the results where slurry formulation VI was used.

The electrical conductance at 20° C. of the slurry to which each compound was added was 0.1 to 0.2 mS/cm in all the Examples.

TABLE 11

|  |  | Compound (A) | Compound (B) | (A)/(B) molar ratio | Addition amount (%) | Slurry flow value (mm) | Kneading time | Slurry viscosity (Pa · s) | Segregation resistance under water | Amount of bleeding water |
|---|---|---|---|---|---|---|---|---|---|---|
| Examples | 9-1 | A-1 | B-1 | 1/1 | 4.28 | 187 | ⊚ | 11.6 | ⊚ | ⊚ |
|  | 9-2 | A-1 | B-4 | 1/1 | 2.43 | 211 | ⊚ | 8.6 | ⊚ | ⊚ |
|  | 9-3 | A-1 | B-4 | 4/1 | 2.43 | 225 | ⊚ | 5.9 | Δ | ○ |
|  | 9-4 | A-3 | B-2 | 1/1 | 1.43 | 198 | ⊚ | 7.1 | ○ | ⊚ |
|  | 9-5 | A-1 | B-2 | 1/1 | 0.5 | 180 | ⊚ | 7.9 | ⊚ | ⊚ |
|  | 9-6 | A-4 | B-6 | 1/2.2 | 17.3 | 178 | ⊚ | 20.2 | ⊚ | ⊚ |
|  | 9-7 | A-5 | B-2 | 1/1 | 2.43 | 207 | ⊚ | 10.2 | ⊚ | ⊚ |
|  | 9-8 | A-6 | B-3 | 1/1 | 4.28 | 188 | ⊚ | 12.4 | ⊚ | ⊚ |
|  | 9-9 | A-7 | B-1 | 1/1 | 1.55 | 186 | ⊚ | 9.4 | ⊚ | ⊚ |
|  | 9-10 | A-8 | B-1 | 1/1 | 1.55 | 184 | ⊚ | 10.0 | ⊚ | ⊚ |
|  | 9-11 | A-8 | B-2 | 1/1 | 2.43 | 193 | ⊚ | 13.1 | ⊚ | ⊚ |
|  | 9-12 | A-8 | B-3 | 1/1 | 4.28 | 170 | ⊚ | 14.1 | ⊚ | ⊚ |

Table 11 shows the results where slurry formulation VII was used.
(Note)
Table 11 shows the results where slurry formulation VII was used.

The electrical conductance at 20° C. of the slurry to which each compound was added was 4.5 to 5 mS/cm in all the Examples.

TABLE 12

|  |  | Compound (A) | Compound (B) | (A)/(B) molar ratio | Addition amount (%) | Slurry flow value (mm) | Kneading time | Slurry viscosity (Pa · s) | Segregation resistance under water | Amount of bleeding water |
|---|---|---|---|---|---|---|---|---|---|---|
| Examples | 10-1 | A-1 | B-1 | 1/1 | 4.28 | 178 | ⊚ | 25.6 | ⊚ | ⊚ |
|  | 10-2 | A-1 | B-4 | 1/1 | 2.43 | 200 | ⊚ | 17.5 | ⊚ | ⊚ |
|  | 10-3 | A-1 | B-4 | 4/1 | 2.43 | 214 | ⊚ | 12.1 | ○ | ⊚ |
|  | 10-4 | A-3 | B-2 | 1/1 | 1.43 | 188 | ⊚ | 13.8 | ⊚ | ⊚ |
|  | 10-5 | A-1 | B-2 | 1/1 | 0.5 | 191 | ⊚ | 14.7 | ⊚ | ⊚ |
|  | 10-6 | A-4 | B-6 | 1/2.2 | 17.3 | 166 | ⊚ | 39.7 | ⊚ | ⊚ |
|  | 10-7 | A-5 | B-2 | 1/1 | 2.43 | 203 | ⊚ | 17.2 | ⊚ | ⊚ |
|  | 10-8 | A-6 | B-3 | 1/1 | 4.28 | 180 | ⊚ | 22.4 | ⊚ | ⊚ |
|  | 10-9 | A-7 | B-1 | 1/1 | 1.55 | 179 | ⊚ | 14.4 | ⊚ | ⊚ |
|  | 10-10 | A-8 | B-1 | 1/1 | 1.55 | 177 | ⊚ | 14.5 | ⊚ | ⊚ |
|  | 10-11 | A-8 | B-2 | 1/1 | 2.43 | 198 | ⊚ | 19.2 | ⊚ | ⊚ |
|  | 10-12 | A-8 | B-3 | 1/1 | 4.28 | 181 | ⊚ | 22.7 | ⊚ | ⊚ |
| Comparative examples | 10-1 | not added | not added | — | — | 303 | ⊚ | 0.22 | X | X |
|  | 10-2 | Comparative product 1 | not added | — | 2.43 | 200 | Δ | 0.85 | X | X |
|  | 10-3 | Comparative product 2 | not added | — | 2.43 | 206 | Δ | 3.6 | X | Δ |
|  | 10-4 | Comparative product 3 | not added | — | 2.43 | 225 | X | 7.1 | X | ○ |
|  | 10-5 | A-1 | glucose | 1/1 | 4.28 | 302 | ⊚ | 0.21 | X | X |
|  | 10-6 | Maleic acid | B-5 | 1/1 | 4.28 | 300 | ⊚ | 0.21 | X | X |

Table 12 shows the results where slurry formulation VIII was used.

(Note)

Table 12 shows the results where slurry formulation VIII was used.

Because Comparative Examples 10-1, 10-5 and 10-6 did not show thickening properties, the slurry had a high slurry value without segregation resistance.

The electrical conductance at 20° C. of the slurry to which each compound was added was 1 to 2 mS/cm in all the Examples and Comparative Examples.

TABLE 13

|  |  | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water |
|---|---|---|---|---|---|---|---|---|---|---|
| Examples | 11-1 | A-1 | B-1 | 1/1 | 4.28 | 174 | ◎ | 26.0 | ◎ | ◎ |
|  | 11-2 | A-1 | B-4 | 1/1 | 2.43 | 203 | ◎ | 17.7 | ◎ | ◎ |
|  | 11-3 | A-1 | B-4 | 4/1 | 2.43 | 211 | ◎ | 12.0 | ○ | ◎ |
|  | 11-4 | A-3 | B-2 | 1/1 | 1.43 | 190 | ◎ | 13.7 | ◎ | ◎ |
|  | 11-5 | A-1 | B-2 | 1/1 | 0.5 | 210 | ◎ | 14.9 | ◎ | ◎ |
|  | 11-6 | A-4 | B-6 | 1/2.2 | 17.3 | 163 | ◎ | 39.9 | ◎ | ◎ |
|  | 11-7 | A-5 | B-2 | 1/1 | 2.43 | 203 | ◎ | 17.3 | ◎ | ◎ |
|  | 11-8 | A-6 | B-3 | 1/1 | 4.28 | 181 | ◎ | 23.4 | ◎ | ◎ |
|  | 11-9 | A-7 | B-1 | 1/1 | 1.55 | 188 | ◎ | 14.1 | ◎ | ◎ |
|  | 11-10 | A-8 | B-2 | 1/1 | 1.43 | 190 | ◎ | 13.9 | ◎ | ◎ |
|  | 11-11 | A-8 | B-3 | 1/1 | 4.28 | 179 | ◎ | 23.7 | ◎ | ◎ |
|  | 11-12 | A-8 | B-1 | 1/1 | 4.28 | 165 | ◎ | 27.9 | ◎ | ◎ |

Table 13 shows the results where slurry formulation IX was used.

(Note)

Table 13 shows the results where slurry formulation IX was used.

The electrical conductance at 20° C. of the slurry to which each compound was added was 0.5 to 2 mS/cm in all the Examples.

TABLE 14

|  |  | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water |
|---|---|---|---|---|---|---|---|---|---|---|
| Examples | 12-1 | A-1 | B-1 | 1/1 | 4.28 | 177 | ◎ | 27.6 | ◎ | ◎ |
|  | 12-2 | A-1 | B-4 | 1/1 | 2.43 | 198 | ◎ | 18.3 | ◎ | ◎ |
|  | 12-3 | A-1 | B-4 | 4/1 | 2.43 | 209 | ◎ | 13.2 | ○ | ◎ |
|  | 12-4 | A-3 | B-2 | 1/1 | 1.43 | 183 | ◎ | 14.0 | ◎ | ◎ |
|  | 12-5 | A-1 | B-2 | 1/1 | 0.5 | 199 | ◎ | 16.2 | ◎ | ◎ |
|  | 12-6 | A-4 | B-6 | 1/2.2 | 17.3 | 155 | ◎ | 40.5 | ◎ | ◎ |
|  | 12-7 | A-5 | B-2 | 1/1 | 2.43 | 200 | ◎ | 17.9 | ◎ | ◎ |
|  | 12-8 | A-6 | B-3 | 1/1 | 4.28 | 175 | ◎ | 27.4 | ◎ | ◎ |
|  | 12-9 | A-7 | B-1 | 1/1 | 1.55 | 176 | ◎ | 14.5 | ◎ | ◎ |
|  | 12-10 | A-8 | B-3 | 1/1 | 4.28 | 170 | ◎ | 27.7 | ◎ | ◎ |
|  | 12-11 | A-8 | B-2 | 1/1 | 2.43 | 189 | ◎ | 18.5 | ◎ | ◎ |
|  | 12-12 | A-8 | B-1 | 1/1 | 1.55 | 169 | ◎ | 15.0 | ◎ | ◎ |

Table 14 shows the results where slurry formulation X was used.
(Note)
Table 14 shows the results where slurry formulation X was used.

The electrical conductance at 20° C. of the slurry to which each compound was added was 0.5 to 2 mS/cm in all the Examples.

the rheology modifier hardly changes thickening properties, and is superior in the conventional thickening agents in Comparative Example 2.

As can be seen from Example 3, when the rheology modifiers of this invention are used in slurry, they are superior to the conventional thickening agents in Comparative Example 3 in respect of the kneading time, slurry viscosity, segregation resistance under water and amount of bleeding water.

TABLE 15

|  |  | Compound (A) | Compound (B) | (A)/(B) molar ratio | Addition amount (%) | Slurry flow value (mm) | Kneading time | Slurry viscosity (Pa·s) | Segregation resistance under water | Amount of bleeding water | Hydration rate |
|---|---|---|---|---|---|---|---|---|---|---|---|
| Examples | 13-1 | A-1 | B-1 | 1/1 | 4.28 | 156 | ◎ | 28.5 | ◎ | ◎ | ○ |
|  | 13-2 | A-1 | B-4 | 1/1 | 2.43 | 181 | ◎ | 20.6 | ◎ | ◎ | ○ |
|  | 13-3 | A-1 | B-4 | 4/1 | 2.43 | 195 | ◎ | 15.0 | ○ | ◎ | ○ |
|  | 13-4 | A-3 | B-2 | 1/1 | 1.43 | 170 | ◎ | 16.9 | ◎ | ◎ | ◎ |
|  | 13-5 | A-1 | B-2 | 1/1 | 0.5 | 180 | ◎ | 18.1 | ◎ | ◎ | ◎ |
|  | 13-6 | A-4 | B-6 | 1/2.2 | 17.3 | 148 | ◎ | 42.8 | ◎ | ◎ | ○ |
|  | 13-7 | A-5 | B-2 | 1/1 | 2.43 | 182 | ◎ | 20.9 | ◎ | ◎ | ◎ |
|  | 13-8 | A-6 | B-3 | 1/1 | 4.28 | 149 | ◎ | 29.2 | ◎ | ◎ | ◎ |
|  | 13-9 | A-7 | B-1 | 1/1 | 1.55 | 165 | ◎ | 17.2 | ◎ | ◎ | ○ |
|  | 13-10 | A-8 | B-1 | 1/1 | 4.28 | 149 | ◎ | 29.7 | ◎ | ◎ | ○ |
|  | 13-11 | A-8 | B-2 | 1/1 | 0.5 | 165 | ◎ | 19.0 | ◎ | ◎ | ◎ |
|  | 13-12 | A-8 | B-3 | 1/1 | 4.28 | 141 | ◎ | 17.2 | ◎ | ◎ | ◎ |
| Comparative examples | 13-1 | not added | not added | — | — | 285 | ◎ | 0.31 | X | X | ○ |
|  | 13-2 | Comparative product 1 | not added | — | 2.43 | 180 | Δ | 9.1 | X | X | X |
|  | 13-3 | Comparative product 2 | not added | — | 2.43 | 175 | X | 10.7 | X | Δ | X |
|  | 13-4 | Comparative product 3 | not added | — | 2.43 | 200 | X | 13.2 | X | Δ | X |
|  | 13-5 | A-1 | glocose | 1/1 | 4.28 | 285 | ◎ | 0.31 | X | X | X |
|  | 13-6 | Maleic acid | B-5 | 1/1 | 4.28 | 285 | ◎ | 0.30 | X | X | X |

Table 15 shows the results where slurry formulation XI was used.
(Note)
Table 15 shows the results where slurry formulation XI was used.

Because Comparative Examples 13-1, 13-5 and 13-6 did not show thickening properties, the slurry had a high slurry value without segregation resistance.

The electrical conductance at 20° C. of the slurry to which each compound was added was 6 to 8 mS/cm in all the Examples and Comparative Examples.

As can be seen from Example 1, the viscosity of a mixture of aqueous solutions of compounds (A) and (B) in this invention is 10 to 100 times or more as high as the viscosity of each aqueous solution before mixing. In particular, when compound (A) is selected from quaternary ammonium salt cationic surfactants while compound (B) is selected from anionic aromatic compounds or brominated compounds, the viscosity of the mixed solution is at least 500 times as high as the viscosity of each aqueous solution before mixing, even having a low viscosity of 10 mPa·s or less at a low concentration of 10% by weight or less.

On the other hand, as can be seen from Comparative Example 1 using conventional thickening agents, the viscosity before mixing should be very high to achieve the same viscosity as in Example 1, thus indicating that the products of this invention are excellent in operativeness during mixing and very superior in thickening properties.

As can be seen from Example 2, the viscosity in this invention is not significantly lowered in a system even at high salt concentration, and in particular, when compound (A) is a quaternary salt type cationic surfactant while compound (B) is an anionic aromatic compound or a brominated compound, Further, as can be seen from Examples 4 to 13, when the rheology modifiers of this invention are used in cement slurry at high salt concentration, inorganic oxides, soil etc., the kneading time is very short, and both the segregation resistance under water and the amount of bleeding water are good. On the other hand, the conventional thickening agents in Comparative Examples 4, 5, 10 and 13 can shorten the kneading time to some degrees by regulating their amount, but cannot achieve satisfactory results for viscosity in the segregation resistance under water and for the amount of bleeding water. When the segregation resistance under water and the amount of bleeding water are to be improved, the amount of the thickening agent added should be increased, and slurry having good properties cannot be obtained. As can be seen from Examples 4, 5 and 13, when a combination wherein compound (B) is a aromatic ring-containing sulfonate is used in a system where normal cement is used as hydraulic powder, not only the kneading time, the slurry is excellent not only in the segregation resistance under water and amount of bleeding water, but also in hydration rate. In Comparative Examples 4, 5 and 6 using conventional thickening agents, when the amount of the thickening agent added is regulated to improve the segregation resistance under water and the amount of bleeding water, the hydration rate is delayed, and slurry having good properties cannot be obtained.

Example 14

The effect of a dispersant used in combination with compounds (A) and (B) on slurry formulation II in Table 4 was measured. That is, fine powder, water, a dispersant in Table 16 and compound (B) were previously kneaded for 30 seconds, and then compound (A) was added thereto, and the mixture was kneaded in a mortar mixer until the fluidity became constant. The amount of the dispersant added was 1.0% by weight relative to the cement. The slurry thus prepared was examined in the same manner as above for the kneading time, slurry flow value, slurry viscosity, segregation resistance under water, amount of bleeding water and hydration rate. The results are shown in Table 17.

TABLE 16

| No. | Dispersant |
|---|---|
| D1 | Polycarboxylic acid polyether type high-performance water-reducing agent (Trade name: Mighty 3000S", produced by Kao Corporation) |
| D2 | Polycarboxylic acid type surfactant (Trade name: "Poise 530", produced by Kao Corporation) |
| D3 | Naphthalene sulfonate-formalin condensate type high-performance water-reducing agent (Trade name: "Mighty 150S", produced by Kao Corporation) |
| D4 | Mlamine sulfonate-formaline condensate type high-performance water-reducing agent(Trade name: "Mighty 150V2", produced by Kao corporation) |
| D5 | Lignin sulfonic acid(Trade name: "No. 70", produced by NMB) |

1. Slump: Slump value (cm) according to JIS A 1101
2. Test for resistance to vibration separation: Concrete produced under the compounding conditions shown in Table 1 was introduced into a cylindrical frame having 15 cm diameter×30 cm height, arranged and fixed to a table vibrator. After vibration at a frequency of 60 Hz (horizontal 1.5 G, vertical 0.22 G) for 30 seconds, the thickness of a paste layer (layer freed of the aggregate by settlement) separated on the upper face of the frame was measured. The evaluation criteria are as follows:

◉ 1 cm or less
○ 1 cm to 2 cm
Δ 2 cm to 3 cm
X 3 cm or more

3. Curing time: Coagulation time was measured in a test of resistance to Procter penetration in JIS A 6204. The evaluation criteria (starting time) are as follows.

○ 7 hours or less
Δ 7 hours to 9 hours
X 9 hours or more

TABLE 17

| | | Compound (A) | Compound (B) | (A)/(B) molar ratio | Addition amount (%) | Dispersant | slurry flow value (mm) | Kneading time | slurry viscosity (Pa·s) | Segregation resistance under water | Amount of bleeding water | Hydration rate |
|---|---|---|---|---|---|---|---|---|---|---|---|---|
| Examples | 14-1 | A-1 | B-1 | 1/1 | 4.28 | D1 | 158 | ◉ | 41.2 | ◉ | ◉ | ○ |
| | 14-2 | A-1 | B-1 | 1/1 | 4.28 | D2 | 145 | ◉ | 42.2 | ◉ | ◉ | ○ |
| | 14-3 | A-1 | B-1 | 1/1 | 2.00 | D3 | 215 | ◉ | 26.5 | ◉ | ○ | ○ |
| | 14-4 | A-1 | B-2 | 1/1 | 2.14 | D1 | 177 | ◉ | 32.9 | ◉ | ◉ | ◉ |
| | 14-5 | A-1 | B-2 | 1/1 | 2.14 | D4 | 193 | ◉ | 29.9 | ◉ | ○ | ◉ |
| | 14-6 | A-2 | B-3 | 1/1 | 4.28 | D1 | 164 | ◉ | 40.0 | ◉ | ◉ | ◉ |
| | 14-7 | A-4 | B-6 | 1/2.2 | 17.3 | D2 | 135 | ◉ | 43.3 | ◉ | ○ | ○ |
| | 14-8 | A-5 | B-2 | 1/1 | 2.43 | D1 | 147 | ◉ | 30.2 | ◉ | ◉ | ◉ |
| | 14-9 | A-8 | B-1 | 1/1 | 4.28 | D1 | 152 | ◉ | 41.5 | ◉ | ◉ | ○ |
| | 14-10 | A-8 | B-2 | 1/1 | 2.86 | D2 | 154 | ◉ | 42.1 | ◉ | ◉ | ◉ |
| Comparative examples | 14-1 | not added | not added | — | — | D1 | 345 | ◉ | 0.1 | X | X | not measurable |
| | 14-2 | Comparative product 1 | not added | — | 0.14 | D1 | 257 | Δ | 1.9 | X | X | X |
| | 14-3 | Comparative product 2 | not added | — | 0.14 | D1 | 241 | X | 6.4 | X | X | Δ |
| | 14-4 | Comparative product 2 | not added | — | 2.43 | D3 | 111 | X | 28.5 | Δ | X | X |
| | 14-5 | Comparative product 3 | not added | — | 2.43 | D1 | 199 | Δ | 28.1 | Δ | Δ | X |

The addition amount in Table 17 is indicative of the total concentration (weight %) of compounds (A) and (B) in the aqueous phase of slurry.

Example 15

Under compounding conditions shown in Table 18, cement (C), small aggregate (S), and coarse aggregate (G) were introduced into a bread-type forced kneading mixer (55 L) of gravity type and kneaded for 10 seconds, and the dispersant shown in Table 16 and kneading water (W) containing compound (B) were added and stirred for 2 minutes, and compound (A) was added thereto, and 40 L concrete was kneaded for 1 minute. The produced concrete was discharged into a kneading plate and measured for slump, resistance to vibration separation, curing time and strength on Day 3. The amount of the dispersant added was regulated such that the slump value according to a method mentioned below became 18 cm.

4. Strength test: Strength on Day 3 was measured in a test of compression strength in JIS A 1108. The evaluation criteria are as follows:

○ 20 N/mm² or more.
Δ 15 N/mm² to 20 N/mm²
X 15 N/mm or less

TABLE 18

| W/C (%) | s/a (%) | Unit quantity(kg/m³) | | | | Air (%) |
|---|---|---|---|---|---|---|
| | | W | C | S | G | |
| 55.3 | 45.0 | 177 | 320 | 792 | 991 | 4.5 | s/a: [S/(S + G)] × 100 (by volume)
S/a: [S/(S + G)] × 100 (by volume)

The used materials in Table 18 are as follows:
Water (W): tap water
Cement (C): normal Portland cement, commercial product, density 3.16 g/cm³
Small aggregate (S): river sand (absolute dry density 2.55 g/cm³, water absorption 1.94%, degree of coarse grain 2.73)
Coarse aggregate (G): rubble (absolute dry density 2.63 g/cm³, water absorption 0.93%, degree of coarse grain 6.71, maximum dimension 20 mm)

TABLE 19

|  |  | Compound (A) | | Compound (B) | | (A)/(B) molar ratio | Dispersant | | Resistance to vibration separation | Curing time | Strength on Day 3 |
|---|---|---|---|---|---|---|---|---|---|---|---|
|  |  | Type | weight % | Type | weight % |  | Type | weight % |  |  |  |
| Examples | 15-1 | A-1 | 0.03 | B-1 | 0.03 | 1/1 | D1 | 0.02 | ○ | ○ | ○ |
|  | 15-2 | A-1 | 0.2 | B-2 | 0.2 | 1/1 | D1 | 0.02 | ◎ | ○ | ○ |
|  | 15-3 | A-1 | 0.4 | B-2 | 0.4 | 4/1 | D1 | 0.02 | ○ | ○ | ○ |
|  | 15-4 | A-1 | 0.4 | B-3 | 0.4 | 1/1 | D1 | 0.03 | ◎ | ○ | ○ |
|  | 15-5 | A-2 | 1.2 | B-2 | 1.2 | 1/1 | D1 | 0.03 | ◎ | ○ | ○ |
|  | 15-6 | A-4 | 0.4 | B-5 | 0.4 | 1/5 | D3 | 0.04 | ○ | ○ | ○ |
|  | 15-7 | A-8 | 0.2 | B-1 | 0.2 | 1/1 | D1 | 0.02 | ◎ | ○ | ○ |
|  | 15-8 | A-8 | 0.2 | B-2 | 0.2 | 1/1 | D4 | 0.04 | ◎ | ○ | ○ |
|  | 15-9 | A-8 | 0.03 | B-2 | 0.03 | 4/1 | D5 | 0.06 | ○ | ○ | ○ |
|  | 15-10 | A-8 | 0.10 | B-2 | 0.10 | 1/1 | D1 | 0.03 | ◎ | △ | ○ |
|  |  | Comparative product 2 | 0.2 |  |  |  |  |  |  |  |  |
| Comparative examples | 15-1 | — | — | — | — | — | D5 | 0.06 | X | ○ | ○ |
|  | 15-2 | A-1 | 0.4 | — | — | — | D1 | 0.02 | X | ○ | ○ |
|  | 15-3 | — | — | B-2 | 0.4 | — | D1 | 0.02 | X | ○ | ○ |
|  | 15-4 | Comparative product 1 | 0.1 | — | — | — | D1 | 0.03 | X | △ | ○ |
|  | 15-5 | Comparative product 2 | 0.1 | — | — | — | D1 | 0.03 | X | X | △ |
|  | 15-6 | Comparative product 2 | 3.0 | — | — | — | D1 | 0.04 | △ | X | X |
|  | 15-7 | Comparative product 3 | 3.0 | — | — | — | D1 | 0.06 | ○ | X | X |

The weight % in Table 19 is indicative of the concentration of the active ingredients relative to the weight of cement.

Figure 1:
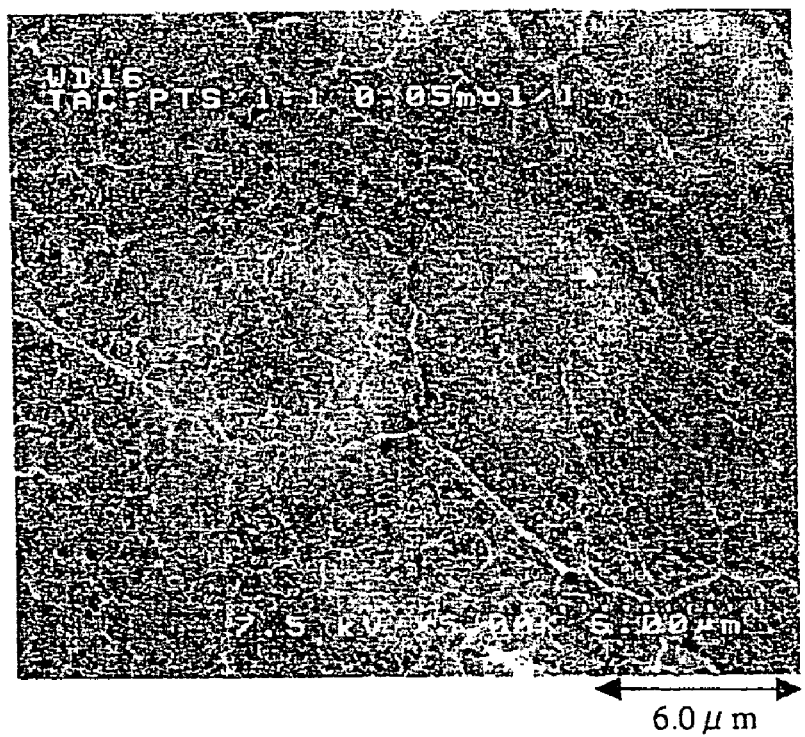
FIG. 1 shows network association product formed in the slurry of Example v2-1-7.
Figure 2:
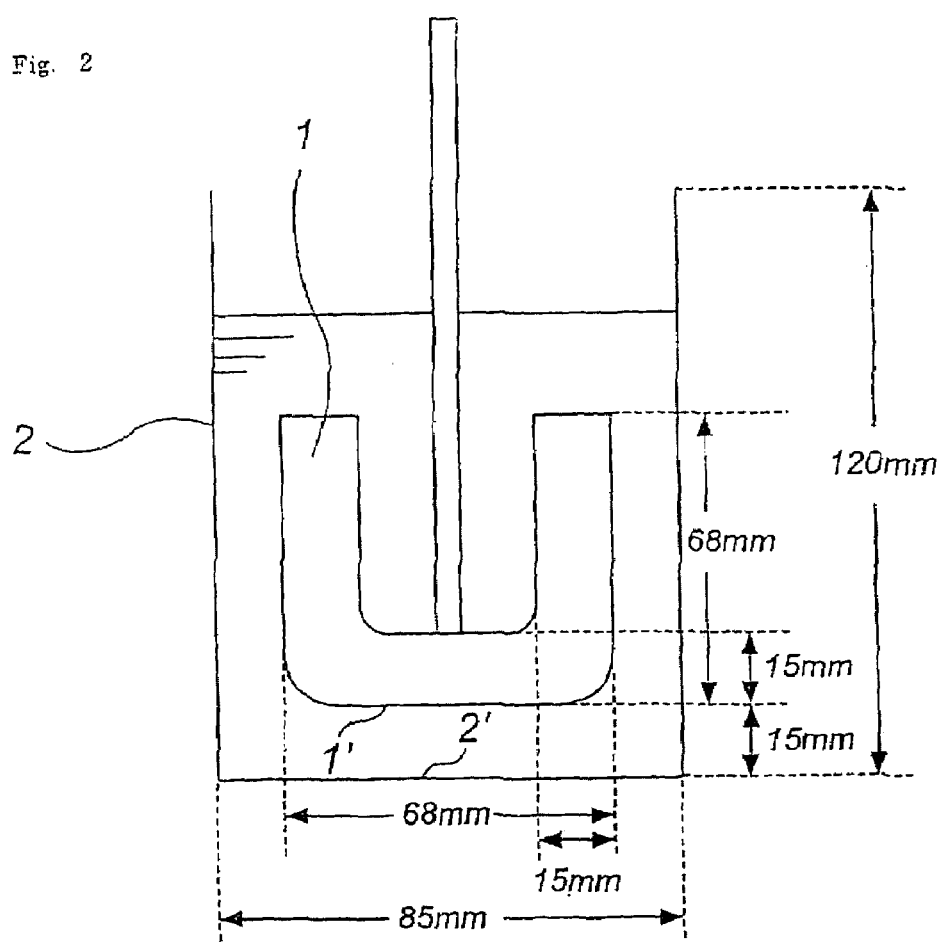
FIG. 2 shows a beaker and stirring vanes contained therein to use for determining the SS concentration in the third embodiment of the invention.

The Hereinafter Described Examples are Coded by V.

Example v1-1

The aqueous solutions (A), the aqueous solutions (B) and the mixed solutions (A+B) shown in Table V2 were prepared in the same way as Example 1. It is specified that the electrical conductance of the mixed solution (A+B) at 20° C. was 26 to 40 mS/cm in Examples v1-1-5 and v1-1-61-1 and 2 to 8 mS/cm in the other V Examples.

TABLE V2

|  |  | Aqueous solution A | | | Aqueous solution B | | | Mixed solution (A + B) | |
|---|---|---|---|---|---|---|---|---|---|
|  |  |  | Compound (A) | | | Compound (B) | | | Viscosity |
|  |  | Type | Concentration (weight %) | Viscosity (20° C./mPa · s) | Type | Concentration (weight %) | Viscosity (20° C./mPa · s) | Concentration (weight %) | (20° C./ mPa · s) |
| Examples | V1-1-1 | A-1 | 2.18 | 5 | B-3 | 1.42 | 1 | 1.8 | 4800 |
|  | V1-1-2 | A-2 | 2.47 | 5 | B-1 | 1.13 | 1 | 1.8 | 5000 |
|  | V1-1-3 | A-2 | 1.28 | 3 | B-2 | 0.72 | 1 | 1.0 | 1300 |
|  | V1-1-4 | A-3 | 1.63 | 3 | B-1 | 0.77 | 1 | 1.2 | 1000 |
|  | V1-1-5 | A-4 | 22.0 | 15 | B-5 | 18.0 | 5 | 20.0 | 1700 |
|  | V1-1-6 | A-4 | 12.0 | 5 | B-6 | 22.5 | 80 | 17.3 | 30500 |
|  | V1-1-7 | A-5 | 2.61 | 5 | B-1 | 0.99 | 1 | 1.8 | 4600 |
|  | V1-1-8 | A-5 | 2.15 | 5 | B-3 | 1.05 | 1 | 1.6 | 4100 |
|  | V1-1-9 | A-6 | 2.32 | 4 | B-1 | 0.88 | 1 | 1.6 | 4100 |
|  | V1-1-10 | A-6 | 2.74 | 4 | B-2 | 1.26 | 1 | 2.0 | 5200 |

TABLE V2-continued

|  |  | Aqueous solution A | | | Aqueous solution B | | | Mixed solution (A + B) | |
|---|---|---|---|---|---|---|---|---|---|
|  |  | Compound (A) | | | Compound (B) | | | | Viscosity |
|  | Type | Concentration (weight %) | Viscosity (20° C./mPa·s) | Type | Concentration (weight %) | Viscosity (20° C./mPa·s) | Concentration (weught %) | (20° C./mPa·s) |
|  | V1-1-11 | A-7 | 2.50 | 5 | B-2 | 1.30 | 1 | 1.9 | 2600 |
|  | V1-1-12 | A-7 | 2.44 | 5 | B-3 | 1.36 | 1 | 1.9 | 2300 |
|  | V1-1-13 | A-8 | 2.57 | 5 | B-1 | 1.23 | 1 | 1.9 | 4650 |
|  | V1-1-14 | A-8 | 2.53 | 5 | B-2 | 1.47 | 1 | 2.0 | 4750 |
|  | V1-1-15 | A-8 | 2.46 | 5 | B-3 | 1.54 | 1 | 1.5 | 3000 |
| Comparative Examples | V1-1-1 | Comparative product 1 | 1.50 | 17000 | water | — | 1 | 0.75 | 1000 |
|  | V1-1-2 | Comparative product 2 | 2.10 | 43000 | water | — | 1 | 1.05 | 3500 |
|  | V1-1-3 | Comparative product 3 | 1.90 | 28000 | water | — | 1 | 0.95 | 1800 |
|  | V1-1-4 | A-1 | 5.20 | 7 | glucose | 2.0 | 1 | 3.6 | 4 |
|  | V1-1-5 | maleic acid | 3.00 | 1 | B-5 | 11.0 | 4 | 7.0 | 3 |

Example V1-2

(1) The compounds (A) and (B) of Table 1 were used to prepare a slurry or an aqueous solution (A) or (B) of each of them at 20° C. having the viscosity shown in Table V3 by controlling concentrations of the effective components. The slurry (A) or (B) was prepared by stirring water, powder of normal Portland cement having a relative gravity of 3.16 and the compound (A) or (B) with a vane-equipped stirrer, National Hand Mixer MK-H3 (tradename of Matushita Electric Industry Co., Ltd. for 30 minutes. The concentration of the effective component is shown based on the aqueous phase of the slurry. From the relationship between the concentration of the aqueous solution and the density of the aqueous solution, the viscosity of every prepared aqueous solution (Table V3) prepared in this example was made 1.0 (g/cm$^3$).

(2) The slurry (A+B) was prepared from (A) and (B) obtained in (1) by combining them as shown in Table V3 in each amount of 250 g and stirring them for 60 minutes with the above shown vane-equipped stirrer and determined in view of the viscosity at 20° C. The viscosity was determined with a viscotester at the rotor's rotation number of 62.5 rpm, using, according to the viscosity of the test sample, No. 3 rotor for 30~300 mPa·s, No. 1 rotor for 300~15000 mPa·s and No. 2 rotor for 15000~400000 mP·s. Results are shown in Table v3. The electric conductivity was determined with HORIBA's CONDUCTIVITY METER DS-15.

TABLE V3

|  |  | A | | | | | B | | | | | Slurry (A + B) | |
|---|---|---|---|---|---|---|---|---|---|---|---|---|---|
|  |  | Compound (A) | | | | | Compound (B) | | | | | | |
|  |  | type | Concentraation (weight %) | water (g) | Fine powder (g) | Viscosity (20° C., mPa·s) | type | Concentration (weight %) | water (g) | Fine powder (g) | Viscosity (20° C., mPa·s) | Concentration (weight %) | Viscosity (20° C., mPa·s) |
| Examples | V1-2-1 | A-1 | 2.42 | 125 | 125 | less than 30 | B-3 | 1.58 | 125 | 125 | less than 30 | 2.0 | 14000 |
|  | V1-2-2 | A-2 | 1.97 | 250 | 0 | less than 30 | B-1 | 2.06 | 110 | 140 | 105 | 2.0 | 3800 |
|  | V1-2-3 | A-2 | 2.78 | 85 | 165 | 1470 | B-2 | 0.89 | 160 | 90 | less than 30 | 1.5 | 10000 |
|  | V1-2-4 | A-3 | 2.22 | 110 | 140 | 100 | B-1 | 0.46 | 250 | 0 | less than 30 | 1.0 | 1100 |
|  | V1-2-5 | A-4 | 21.0 | 150 | 100 | less than 30 | B-5 | 21.0 | 100 | 150 | 132 | 21.0 | 16000 |
|  | V1-2-6 | A-4 | 4.05 | 200 | 50 | less than 30 | B-6 | 18.9 | 100 | 150 | 132 | 9.0 | 3600 |
|  | V1-2-7 | A-5 | 2.47 | 240 | 10 | less than 30 | B-1 | 0.93 | 240 | 10 | less than 30 | 1.7 | 2500 |
|  | V1-2-8 | A-5 | 2.55 | 75 | 175 | 2402 | B-3 | 1.25 | 75 | 175 | 2397 | 1.9 | 13000 |
|  | V1-2-9 | A-6 | 2.61 | 125 | 125 | less than 30 | B-1 | 0.99 | 125 | 125 | less than 30 | 1.8 | 10000 |
|  | V1-2-10 | A-6 | 1.78 | 250 | 0 | less than 30 | B-2 | 1.85 | 110 | 140 | 99 | 1.8 | 3700 |
|  | V1-2-11 | A-7 | 3.79 | 85 | 165 | 1502 | B-2 | 1.05 | 160 | 90 | less than 30 | 2.0 | 8000 |
|  | V1-2-12 | A-7 | 4.20 | 110 | 140 | 97 | B-3 | 1.03 | 250 | 0 | less than 30 | 2.0 | 3100 |
|  | V1-2-13 | A-8 | 2.25 | 150 | 100 | less than 30 | B-1 | 1.62 | 100 | 150 | 128 | 2.0 | 10000 |
|  | V1-2-14 | A-8 | 1.80 | 200 | 50 | less than 30 | B-2 | 2.10 | 100 | 150 | 120 | 1.9 | 3200 |
|  | V1-2-15 | A-8 | 2.83 | 240 | 10 | less than 30 | B-3 | 1.77 | 240 | 10 | less than 30 | 2.3 | 3000 |
| Comparative examples | V1-2-1 | Comparative product 2 | 1.2 | 125 | 125 | 5000 | water | 1.2 | 125 | 125 | 5000 | 0.7 | 5000 |
|  | V1-2-2 | Comparative product 3 | 0.5 | 85 | 165 | 9000 | water | 1.27 | 160 | 90 | 300 | 1.0 | 2300 |
|  | V1-2-3 | Comparative product 3 | 0.5 | 110 | 140 | 4000 | water | 1.22 | 250 | 0 | 250 | 1.0 | 820 |
|  | V1-2-4 | A-1 | 3.0 | 125 | 125 | less than 30 | glucose | 3.0 | 125 | 125 | less than 30 | 3.0 | less than 30 |
|  | V1-2-5 | Maleic acid | 5.0 | 125 | 125 | less than 30 | B-5 | 5.0 | 125 | 125 | less than 30 | 5.0 | less than 30 |

Note: The electrical conductance of the slurries (A+B) of Examples shown in Table V3 at 20° C. was 9 to 14 mS/cm. In Comparative Example v1-2-4 and v1-2-5, since the viscosity of A, B and A+B was too low to determine with the above shown viscotester, but was found to be all 140 mPa·s with B type viscometer (TOKIMEC Inc., VISCOMETER MODEL BM, 30 r.p.m., No. 2 rotor).

⊚: not less than 0.05 μm and less than 2.0 μm
○: not less than 0.01 μm and less than 0.05 μm
X: less than 0.01 μm

TABLE V4

|  |  | Compound (A) | Compound (B) | (A)/(B) molar ratio | Concentration (A) + (B) (weight %) | association product in network | | |
|---|---|---|---|---|---|---|---|---|
|  |  |  |  |  |  | existence of formation | length | diameter |
| Examples | V2-1-1 | A-1 | B-1 | 1/1 | 2.2 | exist | ○ | ⊚ |
|  | V2-1-2 | A-2 | B-2 | 2/3 | 0.9 | exist | ○ | ⊚ |
|  | V2-1-3 | A-3 | B-3 | 1/1 | 1.6 | exist | ○ | ⊚ |
|  | V2-1-4 | A-4 | B-5 | 1/3 | 2.1 | exist | ○ | ○ |
|  | V2-1-5 | A-5 | B-2 | 1/1 | 2.2 | exist | ○ | ⊚ |
|  | V2-1-6 | A-8 | B-2 | 2/3 | 1.8 | exist | ○ | ⊚ |
|  | V2-1-7 | A-1 | B-1 | 1/1 | 2.6 | exist | ○ | ⊚ |
| Comparative examples | V2-1-1 | Maleic acid | B-5 | 4/1 | 7.0 | none | — | — |
|  | V2-1-2 | A-1 | glucose | 1/2 | 6.0 | none | — | — |

*Concetration of (A) + (B) means a concentration in the aqueous phase of the slurry including the compounds (A) and (B) and water for 100 percent. by weight. This is referred to hereinafter.

Example v2-1

Preparation of Slurry

The compounds (A) and (B) shown in Table v4 were used to prepare slurries. For example the slurry of Example v2-1-7 was prepared in the below described manner. The other slurries of Example and Comparative Example were prepared in the same way as this. 1.6 parts by weight of hexadecyltrimethylammonium chloride (compound (A)), 0.97 part by weight of sodium p-toluenesulfonate (compound (B)), 97.43 parts by weight of water and 77.0 parts by weight of blast furnace slag having Esment100P and a Blain value of 10000 cm²/g, obtained from ShinNittetsu Chemical Co., Ltd., were uniformly mixed to prepare a slurry. One drop of the slurry was pressed on a copper plate and rapidly frozen to obtain the sample.

<Observation Conditions>

The sample was observed with an electron microscope of electric field radiation type, named by FE-SEM, S-4000 (tradename of Hitachi Ltd.), equipped with cryounit, at scanning of 7.5 kV. The electron microscopic picture was shown in FIG. 1, where white circular objects are powder and the formed association product in network including strands the association is observed around the powder.

Slurries were prepared from the compounds (A) and (B) shown in Table V4 in the same manner as above and observed in view of association product in network. Results are shown in Table V4. All the slurries included 77 parts by weight of powder of the above shown blast furnace slag and the compounds (A) and (B) at concentrations and ratios shown in Table V4. The water content was adjusted for 100 parts by weight in total of the compounds (A) and (B). The strands of association forming network were marked in view of the length between intersecting points and the diameter based on the below shown standards:

(length)
○: 0.01~100 μm
X: less than 0.01 μm or more than 100 μm
(diameter)

Example v2-2

Slurries including compounds (A) and (B) in combination shown in Table V5, 100 g of water and 100 g of normal Portland cement, obtained from Taiheiyou Cement Co., Ltd., were observed in view of SS in the below shown manner, also in view of turbidity. The slurries were prepared by mixing and kneading water, normal Portland cement and the compound (B) with a hand mixer, MK-H3 of Matsushita Electric Industries Ltd., for 30 seconds, then adding the compound (A) and mixing them further for 60 seconds. The mole ration of (A) to (B) are shown in Table V5. Results are shown in Table V5.

Within 1 minute after the preparation of the slurry, 30 mL at 20° C. of the slurry was dropped into 500 mL at 20° C. of ion-exchanged water in a 500 mL beaker, JIS R3503, of boron silicate glass, having the diameter of 85 mm and the height of 120 mm, from the height of 3 cm above the water surface over 15±5 seconds, then allowing it to stand for 10 seconds, stirring it for 10 seconds with a mechanical mixer, being of vane type and anchor type having the width and the height of 68 mm×68 mm, HEIDON BL600 of Shinto Kagaku Co., Ltd., the stirring vanes being fixed at a distance of 1.5 cm above the inner bottom surface of the beaker, at 60 r.p.m., allowing it to stand for 10 seconds, taking a portion thereof at the depth of 4.5 cm from the water surface as a sample for determining the SS concentration and the turbidity of the portion.

1. Determination of Concentration of SS (Suspended Solid)

Five mL of the above obtained sample was put on an aluminum foil dish and water was evaporated at 105° C. for 2 hours. The mass of the residue was gauged and the concentration was calculated. It was marked based on the below shown standards:

⊚: not more than 350 mg/L
○: more than 350 mg/L and not more than 500 mg/L
○~Δ: more than 500 mg/L and not more than 1000 mg/L
Δ: more than 1000 mg/L and not more than 1500 mg/L
X: more than 1500 mg/L 2. Turbidity;

The sample was determined in view of turbidity with a calorimeter, Model ND-1001DP, available from Nihon Denshoku Kogyo Co., Ltd., having the length of light-absorbing cell of 10 mm and 12 V 50 W halogen lamp, within 1 minute after taking of the sample, according to the following equation, marked by the following standards.

Turbidity(%)=diffusibility(%)×100/total through-passing light efficiency(%)

○: not more than 6.0%
Δ: more than 6.0% and not less than 30%
X: more than 30%

TABLE V5

| | | Compound (A) | Compound (B) | (A)/(B) molar ratio | Concenration of (A) + (B) (weight %) | SS | tubidity |
|---|---|---|---|---|---|---|---|
| Examples | V2-2-1 | A-1 | B-1 | 1/1 | 1.0 | ○ | ○ |
| | V2-2-2 | A-1 | B-1 | 1/1 | 2.0 | ◉ | ○ |
| | V2-2-3 | A-2 | B-2 | 1/1 | 1.5 | ◉ | ○ |
| | V2-2-4 | A-3 | B-3 | 1/1 | 1.6 | ◉ | ○ |
| | V2-2-5 | A-5 | B-2 | 1/1 | 2.0 | ◉ | ○ |
| | V2-2-6 | A-8 | B-2 | 1/1 | 2.0 | ◉ | ○ |
| | V2-2-7 | A-8 | B-1 | 1/1 | 1.8 | ◉ | ○ |
| | V2-2-8 | A-1 | B-1 | 1/2 | 2.0 | ○ | ○ |
| | V2-2-9 | A-8 | B-1 | 3/2 | 1.8 | ○ | ○ |
| Comparative examples | V2-2-1 | Comparative product 1 | — | — | 1.0 | X | X |
| | V2-2-2 | Comparative product 2 | — | — | 1.0 | X | X |
| | V2-2-3 | Comparative product 3 | — | — | 1.0 | Δ | X |
| | V2-2-4 | — | — | — | — | X | X |

*Concentration of (A) + (B) is that of the aqueous phase of the slurry.

Example v2-3

Figure 3:
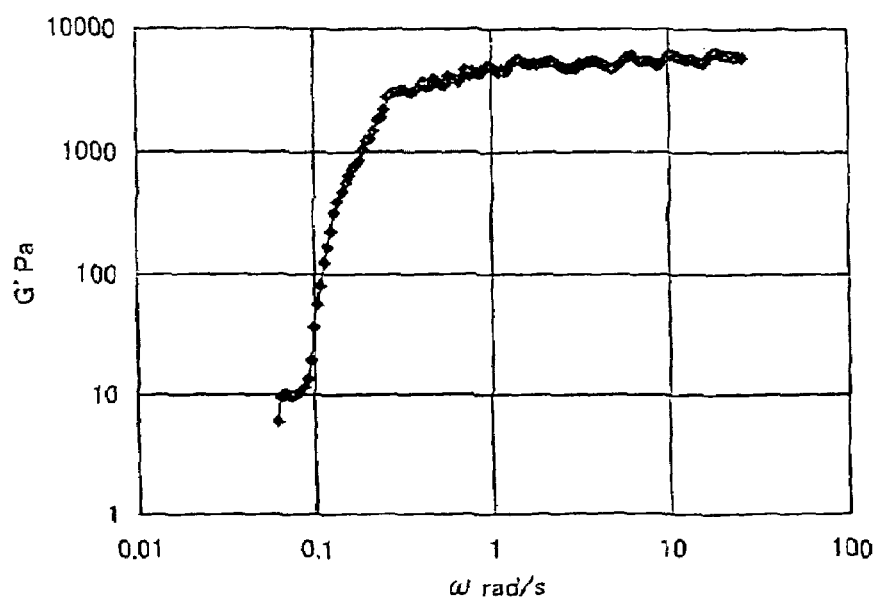
FIG. 3 is a graph showing the relation between the angular ω and the modulus of storage elasticity G' in determination of viscoelasticity of Example v2-3-9.

Slurries including the compounds (A) and (B) in combination shown in V6, 100 g of water and 100 g of calcium carbonate were determined in view of modulus of storage elasticity G'. The modulus of storage elasticity G' was determined with an ARES viscoelasticity meter, made by Rheometric Scientific Co., Ltd., using a cone plate having a diameter of 50 mm, an angle of 0.0398 rad and GAP of 0.0508 mm, at the strain of 1.0% in the range of 0.0628~62.8 rad/s, at 20° C. G'min/G'max was calculated from the results at the angular velocity ω of 1~10 rad/s and evaluated in the below shown manner. $G'_{max}$ was also evaluated in the below shown manner. Results of Example v2-3-9 are shown in FIG. 3, which G' was almost constant at the angular velocity ω of 1~10 rad/s, $G'_{min}$ was 4550 Pa (ω=1.1 rad/s), $G'_{max}$ was 6160 Pa (ω=10 rad/s) and $G'_{min}/G'_{max}$ was 0.74.

(Evaluation of $G'_{min}/G'_{max}$)
◉: $G'_{min}/G'_{max}$ of not less than 0.65 and less than 1.0
○: $G'_{min}/G'_{max}$ of not less than 0.4 and less than 0.65
X: $G'_{min}/G'_{max}$ of less than 0.4

(Evaluation of $G'_{max}$)
◉: $G'_{max}$ of 1000~10000 Pa
Δ: $G'_{max}$ of 10~100000 Pa, except for ◉ and ○
X: $G'_{max}$ of less than 10 Pa or more than 100000 Pa

TABLE V6

| | | Compound (A) | Compound (B) | (A)/(B) molar ratio | Concentration of (A) + (B) (weight %) | $G'_{max}$ (Pa) | $G'_{min}/G'_{max}$ |
|---|---|---|---|---|---|---|---|
| Examples | V2-3-1 | A-1 | B-1 | 1/1 | 1.5 | ◉ | ◉ |
| | V2-3-2 | A-2 | B-2 | 1/1 | 1.8 | ◉ | ◉ |
| | V2-3-3 | A-3 | B-3 | 1/1 | 1.5 | ◉ | ◉ |
| | V2-3-4 | A-5 | B-2 | 1/1 | 1.7 | ◉ | ◉ |
| | V2-3-5 | A-8 | B-2 | 1/1 | 1.7 | ◉ | ◉ |
| | V2-3-6 | A-8 | B-1 | 1/1 | 1.9 | ◉ | ◉ |
| | V2-3-7 | A-1 | B-1 | 1/2 | 1.5 | ○ | ◉ |
| | V2-3-8 | A-8 | B-1 | 3/2 | 1.9 | ○ | ◉ |
| | V2-3-9 | A-1 | B-2 | 1/1 | 1.0 | ◉ | ◉ |
| Comparative examples | V2-3-1 | Comparative product 1 | — | — | 1.0 | Δ | X |
| | V2-3-2 | Comparative product 2 | — | — | 1.0 | Δ | X |

TABLE V6-continued

|  | Compound (A) | Compound (B) | (A)/(B) molar ratio | Concentration of (A) + (B) (weight %) | $G'_{max}$ (Pa) | $G'_{min}/G'_{max}$ |
|---|---|---|---|---|---|---|
| V2-3-3 | Comparative product 3 | — | — | 1.0 | Δ | X |

*Concentration of (A) + (B) is that of the aqueous phase of the slurry.

Example v3~v13 and Comparative Example v3~v5, v10, v13

(1) Slurry Formulation

Slurry having each formulation shown in Table 4 was prepared. Formulation I was used in Example V3 and Comparative Example V3 (Table V8). Similarly, formulations II to XI were used in Example V4, Comparative Example V4 (Table V9) to Example V13 and Comparative Example V13 (Table V18).

(2) Preparation of Slurry

In Examples and Comparative Examples V3-5, V3-6, V4-8, V4-9, V5-5, V5-6, V10-5, V10-6, V13-5 and V13-6, fine powder, water and compound (B) were previously kneaded for 30 seconds, then compound (A) was added thereto, and the mixture was kneaded until the fluidity became constant.

In other comparative examples, fine powder and water were previously mixed, and a comparative compound was added thereto and kneaded until the fluidity became constant. Thereafter, the same operation as in the Examples was conducted.

Formulation I was kneaded using a homomixer, and the other formulations were kneaded using a mortar mixer. Preparation of slurry was conducted at 20° C.

Slurry thus prepared was evaluated for 5 items, that is, kneading time, slurry flow value, slurry viscosity, resistance to separation in water, and amount of bleeding water shown below. For formulations II, III and XI (Tables V9, V10 and V18), hydration rate was also measured. Results are shown in Table V8 to V18.

TABLE V8

|  |  | Compound (A) | Compound (B) | (A)/(B) molar ratio | Addition amount (%) | Slurry flow value (mm) | Kneading time | Slurry viscosity (Pa·s) | Resistance to separation in water | Amount of bleeding water |
|---|---|---|---|---|---|---|---|---|---|---|
| Examples | V3-1 | A-1 | B-1 | 4/1 | 2.0 | 176 | ⊚ | 2.7 | ○ | ○ |
|  | V3-2 | A-1 | B-4 | 4/1 | 3.5 | 145 | ⊚ | 10.4 | ⊚ | ⊚ |
|  | V3-3 | A-3 | B-2 | 1/1 | 4.0 | 142 | ⊚ | 14.0 | ○ | ⊚ |
|  | V3-4 | A-1 | B-2 | 1/1 | 0.5 | 132 | ⊚ | 11.1 | ⊚ | ⊚ |
|  | V3-5 | A-4 | B-5 | 1/2.2 | 17.0 | 125 | ○ | 44.0 | ○ | ○ |
|  | V3-6 | A-8 | B-2 | 1/1 | 0.5 | 129 | ⊚ | 11.9 | ⊚ | ⊚ |
|  | V3-7 | A-8 | B-1 | 1/1 | 2.0 | 133 | ⊚ | 12.1 | ⊚ | ⊚ |
|  | V3-8 | A-8 | B-3 | 2/3 | 2.0 | 135 | ⊚ | 11.1 | ⊚ | ⊚ |
| Comparative examples | V3-1 | not added | not added | — | — | 320 | ⊚ | 0.09 | X | X |
|  | V3-2 | Comparative product 1 | not added | — | 3.5 | 201 | X | 1.6 | Δ | Δ |
|  | V3-3 | Comparative product 2 | not added | — | 3.5 | 167 | X | 6.2 | X | Δ |
|  | V3-4 | Comparative product 3 | not added | — | 3.5 | 155 | X | 9.8 | Δ | Δ |
|  | V3-5 | A-1 | glucose | 1/1 | 4.0 | 319 | ⊚ | 0.09 | X | X |
|  | V3-6 | Maleic acid | B-5 | 1/1 | 4.0 | 320 | ⊚ | 0.07 | X | X |

(note): Table V8 shows results of Formulation I.

In Comparative Example V3-1, v3-5 and v3-6, no thickening effect was obtained and therefore the slurry had no resistance to separation and a large value of slurry flow.

The electric conductivity at 20° C. of slurry including each compound was 2~10 mS/cm all in Examples and Comparative Examples.

TABLE V9

|  |  | Compound (A) | Compound (B) | (A)/(B) molar ratio | Addition amount (%) | Slurry flow value (mm) | kneading time | Slurry viscosity (Pa·s) | Segregation resistance in water | Amount of bleeding water | hydration rate |
|---|---|---|---|---|---|---|---|---|---|---|---|
| Examples | V4-1 | A-1 | B-1 | 1/1 | 4.00 | 131 | ⊚ | 45.0 |  | ⊚ | ○ |
|  | V4-2 | A-1 | B-1 | 1/1 | 1.50 | 184 | ⊚ | 29.9 | ⊚ | ⊚ | ○ |
|  | V4-3 | A-1 | B-1 | 4/1 | 1.20 | 185 | ⊚ | 14.3 | ○ | ○ | ○ |
|  | V4-4 | A-1 | B-1 | 1/3 | 3.50 | 127 | ⊚ | 41.2 | ⊚ | ⊚ | ○ |
|  | V4-5 | A-1 | B-2 | 2/3 | 2.00 | 161 | ⊚ | 33.1 | ⊚ | ⊚ | ○ |
|  | V4-6 | A-1 | B-4 | 1/1 | 2.45 | 165 | ⊚ | 29.5 | ⊚ | ○ | ○ |
|  | V4-7 | A-2 | B-1 | 1/1 | 2.90 | 130 | ⊚ | 45.0 | ⊚ | ⊚ | ○ |

TABLE V9-continued

|  |  | Compound (A) | Compound (B) | (A)/(B) molar ratio | Addition amount (%) | Slurry flow value (mm) | kneading time | Slurry viscosity (Pa·s) | Segregation resistance in water | Amount of bleeding water | hydration rate |
|---|---|---|---|---|---|---|---|---|---|---|---|
|  | V4-8 | A-2 | B-3 | 4/1 | 0.70 | 177 | ◎ | 13.0 | ○ | ○ | ◎ |
|  | V4-9 | A-3 | B-2 | 1/1 | 1.45 | 151 | ◎ | 31.8 | ○ | ◎ | ◎ |
|  | V4-10 | A-1 | B-2 | 1/1 | 0.50 | 160 | ◎ | 33.9 | ◎ | ◎ | ◎ |
|  | V4-11 | A-4 | B-5 | 1/2.2 | 18.0 | 116 | ○ | 47.7 | ○ | ○ | ○ |
|  | V4-12 | A-5 | B-2 | 1/1 | 2.45 | 126 | ◎ | 31.6 | ◎ | ◎ | ◎ |
|  | V4-13 | A-6 | B-3 | 1/1 | 4.00 | 118 | ◎ | 41.8 | ◎ | ◎ | ◎ |
|  | V4-14 | A-7 | B-1 | 2/3 | 1.55 | 141 | ◎ | 18.9 | ○ | ○ | ○ |
|  | V4-15 | A-8 | B-2 | 1/1 | 2.90 | 130 | ◎ | 45.3 | ◎ | ◎ | ◎ |
|  | V4-16 | A-8 | B-3 | 1/1 | 4.00 | 118 | ◎ | 41.7 | ◎ | ◎ | ◎ |
|  | V4-17 | A-8 | B-1 | 2/3 | 4.00 | 135 | ◎ | 43.9 | ◎ | ◎ | ○ |
| Comparative examples | V4-1 | not added | not added | — | — | 280 | ◎ | 0.40 | X | X | ○ |
|  | V4-2 | Comparative product 1 | not added | — | 0.14 | 244 | Δ | 2.3 | X | X | Δ |
|  | V4-3 | Comparative product 1 | not added | — | 2.43 | 126 | X | 18.9 | ○ | Δ | X |
|  | V4-4 | Comparative product 2 | not added | — | 0.14 | 203 | X | 8.2 | X | X | Δ |
|  | V4-5 | Comparative product 2 | not added | — | 2.43 | 150 | X | 27.1 | Δ | X | X |
|  | V4-6 | Comparative product 3 | not added | — | 0.14 | 209 | Δ | 11.6 | X | X | X |
|  | V4-7 | Comparative product 3 | not added | — | 2.43 | 177 | X | 30.8 | ○ | ○ | X |
|  | V4-8 | A-1 | glucose | 1/1 | 3.57 | 279 | ◎ | 0.41 | X | X | X |
|  | V4-9 | Maleic acid | B-5 | 1/1 | 3.57 | 271 | ◎ | 0.35 | X | X | X |

(note): Table V9 shows results of Formulation II.

In Comparative Example V4-1, V4-8 and V4-9, no thickening effect was obtained and therefore the slurry had no resistance to separation and a large value of slurry flow.

The electric conductivity at 20° C. of slurry including each compound was 25~33 mS/cm all in Examples and Comparative Examples.

TABLE V10

|  |  | Compound (A) | Compound (B) | (A)/(B) molar ratio | Addition amount (%) | Slurry flow value (mm) | Kneading time | Slurry viscosity (Pa·s) | Segregation resistance in water | amount of bleeding water | hydrarion rate |
|---|---|---|---|---|---|---|---|---|---|---|---|
| Examples | V5-1 | A-1 | B-1 | 1/1 | 4.0 | 100 | ◎ | 56.1 | ◎ | ◎ | ○ |
|  | V5-2 | A-1 | B-4 | 1/1 | 2.45 | 118 | ◎ | 47.7 | ◎ | ◎ | ○ |
|  | V5-3 | A-1 | B-4 | 4/1 | 2.45 | 131 | ◎ | 39.8 | ◎ | ◎ | ○ |
|  | V5-4 | A-3 | B-2 | 2/3 | 1.45 | 109 | ◎ | 43.4 | ◎ | ◎ | ◎ |
|  | V5-5 | A-2 | B-2 | 1/1 | 0.5 | 115 | ◎ | 38.7 | ◎ | ◎ | ◎ |
|  | V5-6 | A-4 | B-5 | 1/2.2 | 18.0 | 81 | ○ | 64.0 | ◎ | ◎ | ○ |
|  | V5-7 | A-5 | B-2 | 1/1 | 2.43 | 117 | ◎ | 46.6 | ◎ | ◎ | ◎ |
|  | V5-8 | A-6 | B-3 | 1/1 | 4.0 | 113 | ◎ | 53.9 | ◎ | ◎ | ◎ |
|  | V5-9 | A-7 | B-1 | 1/1 | 1.55 | 128 | ◎ | 44.7 | ◎ | ◎ | ○ |
|  | V5-10 | A-8 | B-2 | 1/1 | 2.45 | 118 | ◎ | 48.3 | ◎ | ◎ | ◎ |
|  | V5-11 | A-8 | B-3 | 2/3 | 4.0 | 113 | ◎ | 54.0 | ◎ | ◎ | ◎ |
|  | V5-12 | A-8 | B-1 | 1/1 | 1.55 | 130 | ◎ | 44.5 | ◎ | ◎ | ○ |
| Comparative examples | V5-1 | not added | not added | — | — | 246 | ◎ | 0.81 | X | X | ○ |
|  | V5-2 | Comparative product 1 | not added | — | 2.45 | 197 | X | 22.7 | ○ | Δ | X |
|  | V5-3 | Comparative product 2 | not added | — | 2.45 | 164 | X | 24.9 | Δ | X | X |
|  | V5-4 | Comparative product 3 | not added | — | 2.45 | 148 | X | 33.3 | ○ | ◎ | X |
|  | V5-5 | A-1 | glucose | 1/1 | 4.0 | 248 | ◎ | 0.76 | X | X | X |
|  | V5-6 | Maleic acid | B-5 | 1/1 | 4.0 | 250 | ◎ | 0.77 | X | X | X |

(note): Table V10 shows results of Formulation III.

In Comparative Example V5-1, V5-5 and V5-6, no thickening effect was obtained and therefore the slurry had no resistance to separation and a large value of slurry flow.

The electric conductivity at 20° C. of slurry including each compound was 35~40 mS/cm all in Examples and Comparative Examples.

TABLE V11

|  |  | Compound (A) | Compound (B) | (A)/(B) molar ratio | Addition amount (%) | Slurry flow value (mm) | Kneading time | Slurry viscosity (Pa · s) | Segregation resistance in water | Amount of bleeding water |
|---|---|---|---|---|---|---|---|---|---|---|
| Examples | V6-1 | A-1 | B-1 | 1/1 | 4.0 | 150 | ◎ | 41.8 | ◎ | ◎ |
|  | V6-2 | A-1 | B-4 | 1/1 | 2.45 | 169 | ◎ | 25.7 | ◎ | ◎ |
|  | V6-3 | A-1 | B-4 | 4/1 | 2.45 | 183 | ◎ | 20.5 | ◎ | ○ |
|  | V6-4 | A-3 | B-2 | 2/3 | 1.45 | 162 | ◎ | 22.8 | ◎ | ◎ |
|  | V6-5 | A-2 | B-2 | 1/1 | 0.5 | 161 | ◎ | 24.3 | ◎ | ◎ |
|  | V6-6 | A-4 | B-5 | 1/2.2 | 18.0 | 130 | ○ | 47.0 | ◎ | ◎ |
|  | V6-7 | A-5 | B-2 | 1/1 | 2.45 | 167 | ◎ | 24.4 | ◎ | ◎ |
|  | V6-8 | A-6 | B-3 | 1/1 | 4.0 | 151 | ◎ | 40.7 | ◎ | ◎ |
|  | V6-9 | A-7 | B-1 | 2/3 | 1.55 | 153 | ◎ | 23.1 | ◎ | ◎ |
|  | V6-10 | A-8 | B-2 | 1/1 | 2.45 | 140 | ◎ | 30.4 | ◎ | ◎ |
|  | V6-11 | A-8 | B-3 | 1/1 | 4.0 | 150 | ◎ | 40.5 | ◎ | ◎ |
|  | V6-12 | A-8 | B-1 | 2/3 | 1.55 | 150 | ◎ | 24.2 | ◎ | ◎ |

(note): Table V10 shows results of Formulation IV.

The electric conductivity at 20° C. of slurry including each compound was 2.5~3.50 mS/cm all in Examples and Comparative Examples.

TABLE V12

|  |  | Compound (A) | Compound (B) | (A)/(B) molar ratio | Addition amount (%) | Slurry flow value (mm) | Kneading time | Slurry viscosity (Pa · s) | Segregation resistance in water | amount of bleeding water |
|---|---|---|---|---|---|---|---|---|---|---|
| Examples | V7-1 | A-1 | B-1 | 1/1 | 4.0 | 189 | ◎ | 25.4 | ◎ | ◎ |
|  | V7-2 | A-1 | B-4 | 2/3 | 2.45 | 209 | ◎ | 15.7 | ◎ | ◎ |
|  | V7-3 | A-1 | B-4 | 4/1 | 2.45 | 223 | ◎ | 11.0 | ○ | ○ |
|  | V7-4 | A-3 | B-2 | 1/1 | 1.45 | 197 | ◎ | 13.4 | ◎ | ◎ |
|  | V7-5 | A-2 | B-2 | 1/1 | 0.5 | 200 | ◎ | 12.1 | ◎ | ◎ |
|  | V7-6 | A-4 | B-6 | 1/2.2 | 18.0 | 175 | ◎ | 39.9 | ◎ | ◎ |
|  | V7-7 | A-5 | B-2 | 1/1 | 2.45 | 206 | ◎ | 14.3 | ◎ | ◎ |
|  | V7-8 | A-6 | B-3 | 2/3 | 4.0 | 173 | ◎ | 24.7 | ◎ | ◎ |
|  | V7-9 | A-7 | B-1 | 1/1 | 1.55 | 194 | ◎ | 13.2 | ◎ | ◎ |
|  | V7-10 | A-8 | B-1 | 1/1 | 4.0 | 185 | ◎ | 26.9 | ◎ | ◎ |
|  | V7-11 | A-8 | B-2 | 2/3 | 2.45 | 199 | ◎ | 16.5 | ◎ | ◎ |
|  | V7-12 | A-8 | B-3 | 1/1 | 4.0 | 164 | ◎ | 27.2 | ◎ | ◎ |

(note): Table V12 shows results of Formulation V.

The electric conductivity at 20° C. of slurry including each compound was 3.8~4.5 mS/cm all in Examples and Comparative Examples.

TABLE V13

|  |  | Compound (A) | Compound (B) | (A)/(B) molar ratio | Addition amount (%) | Slurry flow value (mm) | Kneading time | Slurry viscosity (Pa · s) | Segregation resistance in water | amount of bleeding water |
|---|---|---|---|---|---|---|---|---|---|---|
| Examples | V8-1 | A-1 | B-1 | 1/1 | 4.0 | 179 | ◎ | 26.4 | ◎ | ◎ |
|  | V8-2 | A-1 | B-4 | 2/3 | 2.45 | 200 | ◎ | 17.5 | ◎ | ◎ |
|  | V8-3 | A-1 | B-4 | 4/1 | 2.45 | 212 | ◎ | 12.0 | ○ | ○ |
|  | V8-4 | A-3 | B-2 | 1/1 | 1.45 | 186 | ◎ | 14.2 | ◎ | ◎ |
|  | V8-5 | A-2 | B-2 | 1/1 | 0.5 | 200 | ◎ | 13.1 | ◎ | ◎ |
|  | V8-6 | A-4 | B-5 | 1/2.2 | 18.0 | 160 | ◎ | 41.1 | ◎ | ◎ |
|  | V8-7 | A-5 | B-2 | 1/1 | 2.45 | 206 | ◎ | 16.3 | ◎ | ◎ |
|  | V8-8 | A-6 | B-3 | 2/3 | 4.0 | 173 | ◎ | 25.0 | ◎ | ◎ |
|  | V8-9 | A-7 | B-1 | 1/1 | 1.55 | 181 | ◎ | 13.4 | ◎ | ◎ |
|  | V8-10 | A-8 | B-1 | 1/1 | 1.55 | 179 | ◎ | 17.2 | ◎ | ◎ |
|  | V8-11 | A-8 | B-2 | 2/3 | 2.45 | 198 | ◎ | 18.5 | ◎ | ◎ |
|  | V8-12 | A-8 | B-3 | 1/1 | 4.0 | 166 | ◎ | 29.1 | ◎ | ◎ |

(note): Table V13 shows results of Formulation VI.

The electric conductivity at 20° C. of slurry including each compound was 0.1~0.2 mS/cm all in Examples and Comparative Examples.

TABLE V14

|  |  | Compound (A) | Compound (B) | (A)/(B) molar ratio | Addition amount (%) | Slurry flow value (mm) | Kneading time | Slurry viscosity (Pa·s) | Segregation resistance in water | amount of bleeding water |
|---|---|---|---|---|---|---|---|---|---|---|
| Examples | V9-1 | A-1 | B-1 | 1/1 | 4.0 | 189 | ⊚ | 11.3 | ⊚ | ⊚ |
|  | V9-2 | A-1 | B-4 | 2/3 | 2.45 | 210 | ⊚ | 8.7 | ⊚ | ⊚ |
|  | V9-3 | A-1 | B-4 | 4/1 | 2.45 | 223 | ⊚ | 6.0 | Δ | ○ |
|  | V9-4 | A-3 | B-2 | 1/1 | 1.45 | 197 | ⊚ | 7.3 | ○ | ⊚ |
|  | V9-5 | A-2 | B-2 | 1/1 | 0.5 | 180 | ⊚ | 7.9 | ⊚ | ⊚ |
|  | V9-6 | A-4 | B-5 | 1/2.2 | 18.0 | 173 | ⊚ | 21.0 | ⊚ | ⊚ |
|  | V9-7 | A-5 | B-2 | 1/1 | 2.45 | 206 | ⊚ | 10.5 | ⊚ | ⊚ |
|  | V9-8 | A-6 | B-3 | 2/3 | 4.0 | 191 | ⊚ | 11.9 | ⊚ | ⊚ |
|  | V9-9 | A-7 | B-1 | 1/1 | 1.55 | 186 | ⊚ | 9.4 | ⊚ | ⊚ |
|  | V9-10 | A-8 | B-1 | 1/1 | 1.55 | 184 | ⊚ | 10.0 | ⊚ | ⊚ |
|  | V9-11 | A-8 | B-2 | 2/3 | 2.45 | 192 | ⊚ | 13.3 | ⊚ | ⊚ |
|  | V9-12 | A-8 | B-3 | 1/1 | 4.0 | 175 | ⊚ | 13.6 | ⊚ | ⊚ |

(note): Table V14 shows results of Formulation VII.

The electric conductivity at 20° C. of slurry including each compound was 4.5~5 mS/cm all in Examples and Comparative Examples.

TABLE V15

|  |  | Compound (A) | Compound (B) | (A)/(B) molar ratio | Addition amount (%) | Slurry flow value (mm) | Kneading time | Slurry viscosity (Pa·s) | Segregation resistance in water | Amount of bleeding water |
|---|---|---|---|---|---|---|---|---|---|---|
| Examples | V10-1 | A-1 | B-1 | 1/1 | 4.0 | 180 | ⊚ | 25.3 | ⊚ | ⊚ |
|  | V10-2 | A-1 | B-4 | 2/3 | 2.45 | 199 | ⊚ | 17.7 | ⊚ | ⊚ |
|  | V10-3 | A-1 | B-4 | 4/1 | 2.45 | 213 | ⊚ | 12.3 | ○ | ⊚ |
|  | V10-4 | A-3 | B-2 | 1/1 | 1.45 | 186 | ⊚ | 14.0 | ⊚ | ⊚ |
|  | V10-5 | A-2 | B-2 | 1/1 | 0.5 | 191 | ⊚ | 14.7 | ⊚ | ⊚ |
|  | V10-6 | A-4 | B-5 | 1/2.2 | 18.0 | 159 | ⊚ | 40.1 | ⊚ | ⊚ |
|  | V10-7 | A-5 | B-2 | 1/1 | 2.45 | 201 | ⊚ | 17.3 | ⊚ | ⊚ |
|  | V10-8 | A-6 | B-3 | 1/1 | 4.0 | 183 | ⊚ | 21.9 | ⊚ | ⊚ |
|  | V10-9 | A-7 | B-1 | 2/3 | 1.55 | 179 | ⊚ | 14.4 | ⊚ | ⊚ |
|  | V10-10 | A-8 | B-1 | 1/1 | 1.55 | 177 | ⊚ | 14.5 | ⊚ | ⊚ |
|  | V10-11 | A-8 | B-2 | 2/3 | 2.45 | 197 | ⊚ | 19.4 | ⊚ | ⊚ |
|  | V10-12 | A-8 | B-3 | 1/1 | 4.0 | 184 | ⊚ | 22.0 | ⊚ | ⊚ |
| Comparative examples | V10-1 | not added | not added | — | — | 303 | ⊚ | 0.22 | X | X |
|  | V10-2 | Comparative product 1 | not added | — | 2.45 | 199 | Δ | 0.86 | X | X |
|  | V10-3 | Comparative product 2 | not added | — | 2.45 | 204 | Δ | 3.7 | X | Δ |
|  | V10-4 | Comparative product 3 | not added | — | 2.45 | 223 | X | 7.3 | X | ○ |
|  | V10-5 | A-1 | glucose | 1/1 | 4.0 | 307 | ⊚ | 0.18 | X | X |
|  | V10-6 | Mleic acid | B-5 | 1/1 | 4.0 | 304 | ⊚ | 0.19 | X | X |

(note): Table V15 shows results of Formulation VIII.

In Comparative Example V10-1, V10-5 and V10-6, no thickening effect was obtained and therefore the slurry had no resistance to separation and a large value of slurry flow.

The electric conductivity at 20° C. of slurry including each compound was 1~2 mS/cm all in Examples and Comparative Examples.

TABLE V16

|  |  | Compound (A) | Compound (B) | (A)/(B) molar ratio | Addition amount (%) | Slurry flow value (mm) | Kneading time | Slurry viscosity (Pa·s) | Segregation resistance in water | Amount of bleeding water |
|---|---|---|---|---|---|---|---|---|---|---|
| Examples | V11-1 | A-1 | B-1 | 1/1 | 4.0 | 177 | ⊚ | 25.7 | ⊚ | ⊚ |
|  | V11-2 | A-1 | B-4 | 2/3 | 2.45 | 202 | ⊚ | 17.8 | ⊚ | ⊚ |
|  | V11-3 | A-1 | B-4 | 4/1 | 2.45 | 209 | ⊚ | 12.2 | ○ | ⊚ |
|  | V11-4 | A-3 | B-2 | 1/1 | 1.45 | 187 | ⊚ | 13.9 | ⊚ | ⊚ |
|  | V11-5 | A-2 | B-2 | 1/1 | 0.5 | 210 | ⊚ | 14.9 | ⊚ | ⊚ |

TABLE V16-continued

|  | Compound (A) | Compound (B) | (A)/(B) molar ratio | Addition amount (%) | Slurry flow value (mm) | Kneading time | Slurry viscosity (Pa·s) | Segregation resistance in water | Amount of bleeding water |
|---|---|---|---|---|---|---|---|---|---|
| V11-6 | A-4 | B-5 | 1/2.2 | 18.0 | 159 | ◎ | 40.7 | ◎ | ◎ |
| V11-7 | A-5 | B-2 | 1/1 | 2.45 | 201 | ◎ | 17.5 | ◎ | ◎ |
| V11-8 | A-6 | B-3 | 1/1 | 4.0 | 184 | ◎ | 22.9 | ◎ | ◎ |
| V11-9 | A-7 | B-1 | 2/3 | 1.55 | 188 | ◎ | 14.1 | ◎ | ◎ |
| V11-10 | A-8 | B-2 | 1/1 | 1.45 | 188 | ◎ | 14.0 | ◎ | ◎ |
| V11-11 | A-8 | B-3 | 2/3 | 4.0 | 182 | ◎ | 23.3 | ◎ | ◎ |
| V11-12 | A-8 | B-1 | 1/1 | 4.0 | 169 | ◎ | 27.6 | ◎ | ◎ |

(note): Table V16 shows results of Formulation IX.
The electric conductivity at 20° C. of slurry including each compound was 0.5~2 mS/cm all in Examples and Comparative Examples.

TABLE V17

|  |  | Compound (A) | Compound (B) | (A)/(B) molar ratio | addition amount (%) | slurry flow value (mm) | Kneading time | Slurry viscosity (Pa·s) | Segregation resistance in water | Amount of bleeding water |
|---|---|---|---|---|---|---|---|---|---|---|
| Examples | V12-1 | A-1 | B-1 | 1/1 | 4.0 | 179 | ◎ | 27.2 | ◎ | ◎ |
|  | V12-2 | A-1 | B-4 | 2/3 | 2.45 | 197 | ◎ | 18.4 | ◎ | ◎ |
|  | V12-3 | A-1 | B-4 | 4/1 | 2.45 | 208 | ◎ | 13.3 | ○ | ◎ |
|  | V12-4 | A-3 | B-2 | 1/1 | 1.45 | 181 | ◎ | 14.1 | ◎ | ◎ |
|  | V12-5 | A-2 | B-2 | 1/1 | 0.5 | 199 | ◎ | 16.2 | ◎ | ◎ |
|  | V12-6 | A-4 | B-5 | 1/2.2 | 18.0 | 150 | ◎ | 40.9 | ◎ | ◎ |
|  | V12-7 | A-5 | B-2 | 1/1 | 2.45 | 199 | ◎ | 18.0 | ◎ | ◎ |
|  | V12-8 | A-6 | B-3 | 1/1 | 4.0 | 178 | ◎ | 27.1 | ◎ | ◎ |
|  | V12-9 | A-7 | B-1 | 2/3 | 1.55 | 176 | ◎ | 14.5 | ◎ | ◎ |
|  | V12-10 | A-8 | B-3 | 1/1 | 4.0 | 173 | ◎ | 27.3 | ◎ | ◎ |
|  | V12-11 | A-8 | B-2 | 2/3 | 2.45 | 188 | ◎ | 18.7 | ◎ | ◎ |
|  | V12-12 | A-8 | B-1 | 1/1 | 1.55 | 169 | ◎ | 15.0 | ◎ | ◎ |

(note): Table V16 shows results of Formulation X.
The electric conductivity at 20° C. of slurry including each compound was 0.5~2 mS/cm all in Examples and Comparative Examples.

TABLE V18

|  |  | Compound (A) | Compound (B) | (A)/(B) molar ratio | Addition amount (%) | Slurry flow value (mm) | Kneading time | Slurry viscosity (Pa·s) | Segregation resistance in water | amount of bleeding water | Hydration rate |
|---|---|---|---|---|---|---|---|---|---|---|---|
| Examples | V13-1 | A-1 | B-1 | 1/1 | 4.0 | 160 | ◎ | 28.2 | ◎ | ◎ | ○ |
|  | V13-2 | A-1 | B-4 | 2/3 | 2.45 | 180 | ◎ | 20.8 | ◎ | ◎ | ○ |
|  | V13-3 | A-1 | B-4 | 4/1 | 2.45 | 193 | ◎ | 15.2 | ○ | ◎ | ○ |
|  | V13-4 | A-3 | B-2 | 1/1 | 1.45 | 168 | ◎ | 17.0 | ◎ | ◎ | ◎ |
|  | V13-5 | A-2 | B-2 | 1/1 | 0.5 | 180 | ◎ | 18.1 | ◎ | ◎ | ◎ |
|  | V13-6 | A-4 | B-5 | 1/2.2 | 18.0 | 142 | ◎ | 43.3 | ◎ | ◎ | ○ |
|  | V13-7 | A-5 | B-2 | 1/1 | 2.45 | 181 | ◎ | 21.0 | ◎ | ◎ | ◎ |
|  | V13-8 | A-6 | B-3 | 1/1 | 4.0 | 153 | ◎ | 28.7 | ◎ | ◎ | ◎ |
|  | V13-9 | A-7 | B-1 | 2/3 | 1.55 | 165 | ◎ | 17.2 | ◎ | ◎ | ○ |
|  | V13-10 | A-8 | B-1 | 1/1 | 4.0 | 152 | ◎ | 29.3 | ◎ | ◎ | ○ |
|  | V13-11 | A-8 | B-2 | 2/3 | 0.5 | 165 | ◎ | 19.0 | ◎ | ◎ | ◎ |
|  | V13-12 | A-8 | B-3 | 1/1 | 4.0 | 144 | ◎ | 16.9 | ◎ | ◎ | ◎ |
| Comparative examples | V13-1 | not added | not added | — | — | 285 | ◎ | 0.31 | X | X | ○ |
|  | V13-2 | Comparative product 1 | not added | — | 2.45 | 179 | Δ | 9.2 | X | X | X |
|  | V13-3 | Comparative product 2 | not added | — | 2.45 | 173 | X | 10.9 | X | Δ | X |
|  | V13-4 | Comparative product 3 | not added | — | 2.45 | 199 | X | 13.3 | X | Δ | X |
|  | V13-5 | A-1 | glucose | 1/1 | 4.0 | 290 | ◎ | 0.29 | X | X | X |
|  | V13-6 | Maleic acid | B-5 | 1/1 | 4.0 | 291 | ◎ | 0.28 | X | X | X |

(note): Table V18 shows results of Formulation XI.
In Comparative Example V13-1, V13-5 and V13-6, no thickening effect was obtained and therefore the slurry had no resistance to separation and a large value of slurry flow.

The electric conductivity at 20° C. of slurry including each compound was 6~8 mS/cm all in Examples and Comparative Examples.

As can be seen from Example V1-1, the viscosity of a mixture of aqueous solutions of compounds (A) and (B) in this invention is 10 to 100 times or more as high as the viscosity of each aqueous solution before mixing. In particular, when compound (A) is selected from quaternary ammonium salt cationic surfactants while compound (B) is selected from anionic aromatic compounds or brominated compounds, the viscosity of the mixed solution is at least 500 times as high as the viscosity of each aqueous solution before mixing, even having a low viscosity of 10 mPa·s or less at a low concentration of 10% by weight or less.

On the other hand, as can be seen from Comparative Example V1-1-1 to V1-1-3 using conventional thickening agents, the viscosity before mixing should be very high to achieve the same viscosity as in Example V1, thus indicating that the products of this invention are excellent in operation during mixing and very superior in thickening properties.

It is noted from Example v1-2 that the viscosity of the slurry mixed with the compounds (A) and (B) increases up to 3 to more than 1000 times as much a viscosity as the aqueous solution or slurry including each before mixing.

It is noted, on the other hand, from Comparative Example v1-2-1~v1-2-3 involved in conventional thickeners that the viscosity of the mixed slurry is between viscosities with (A) and (B), respectively, before mixing, that is lower than the higher one of (A) and (B).

In Example v2-1 including the compounds (A) and (B), an association product in network was observed in the slurry, but it was not observed in Comparative Example.

In Example v2-2, the slurry including the compounds (A) and (B) of the invention, powder and water had an SS concentration of not more than 500 mg/L and a turbidity of not more than 6%, but the slurry of Comparative Example had an SS concentration of more than 1000 mg/L and a turbidity of more than 30%, In Example v2-3, the slurry including the compounds (A) and (B) of the invention, powder and water had $G'_{max}$ of 1000~10000 Pa and a deviation of $G'$ ($G'_{min}/G'_{max}$) of not less than 0.4 and less than 1.0, but that of Comparative Example had $G'_{max}$ of 10~100000 Pa and a deviation of $G'$ ($G'_{min}/G'_{max}$) of less than 0.4.

As can be seen from Example V1-2, the viscosity in this invention is not significantly lowered in a system even at high salt concentration, and in particular, when compound (A) is a quaternary salt type cationic surfactant while compound (B) is an anionic aromatic compound or a brominated compound, the rheology modifier hardly changes thickening properties, and is superior in the conventional thickening agents in Comparative Example 2.

As can be seen from Example V1-3, when the rheology modifiers of this invention are used in slurry, they are superior to the conventional thickening agents in Comparative Example V3 in respect of the kneading time, slurry viscosity, resistance to separation in water and amount of bleeding water.

Further, as can be seen from Examples V4 to V13, when the rheology modifiers of this invention are used in cement slurry at high salt concentration, inorganic oxides, soil etc., the kneading time is very short, and both the resistance to separation in water and the amount of bleeding water are good. On the other hand, the conventional thickening agents in Comparative Examples V4, V5, V10 and V13 can shorten the kneading time to some degrees by regulating their amount, but cannot achieve satisfactory results for viscosity in the resistance to separation in water and for the amount of bleeding water. When the resistance to separation in water and the amount of bleeding water are to be improved, the amount of the thickening agent added should be increased, and slurry having good properties cannot be obtained. As can be seen from Examples V4, V5 and V13, when a combination wherein compound (B) is a aromatic ring-containing sulfonate is used in a system where normal cement is used as hydraulic powder, not only the kneading time, the slurry is excellent not only in the resistance to separation in water and amount of bleeding water, but also in hydration rate. In Comparative Examples V4, V5 and V6 using conventional thickening agents, when the amount of the thickening agent added is regulated to improve the resistance to separation in water and the amount of bleeding water, the hydration rate is delayed, and slurry having good properties cannot be obtained.

Example V14

Slurries were prepared and determined in the same way as Example 14 except for those of Table V20. Results are shown in Table V20.

TABLE V20

|  |  | Compound (A) | Compound (B) | (A)/(B) molar ratio | Addition amount (%) | Dispersant | Slurry flow value (mm) | Kneading time | Slurry viscosity (Pa·s) | Segregation resistance in water | amount of bleeding water | Hydration rate |
|---|---|---|---|---|---|---|---|---|---|---|---|---|
| Examples | V14-1 | A-1 | B-1 | 1/1 | 4.0 | D1 | 161 | ◎ | 40.9 | ◎ | ◎ | ○ |
|  | V14-2 | A-1 | B-1 | 1/1 | 4.5 | D2 | 140 | ◎ | 42.5 | ◎ | ◎ | ○ |
|  | V14-3 | A-1 | B-1 | 1/1 | 2.00 | D3 | 215 | ◎ | 26.5 | ◎ | ○ | ○ |
|  | V14-4 | A-1 | B-2 | 2/3 | 2.14 | D1 | 177 | ◎ | 32.9 | ◎ | ◎ | ◎ |
|  | V14-5 | A-2 | B-2 | 1/1 | 2.14 | D4 | 193 | ◎ | 29.9 | ◎ | ○ | ◎ |
|  | V14-6 | A-2 | B-3 | 1/1 | 4.0 | D1 | 164 | ◎ | 39.7 | ◎ | ◎ | ◎ |
|  | V14-7 | A-4 | B-5 | 1/2.2 | 18.0 | D2 | 135 | ◎ | 43.8 | ◎ | ○ | ○ |
|  | V14-8 | A-5 | B-2 | 1/1 | 2.45 | D1 | 145 | ◎ | 30.3 | ◎ | ◎ | ◎ |
|  | V14-9 | A-8 | B-1 | 2/3 | 4.0 | D1 | 156 | ◎ | 41.1 | ◎ | ◎ | ○ |
|  | V14-10 | A-8 | B-2 | 1/1 | 3.0 | D2 | 149 | ◎ | 42.7 | ◎ | ◎ | ◎ |
| Comparative example | V14-1 | not added | not added | — | — | D1 | 345 | ◎ | 0.1 | X | X | not measurable |
|  | V14-2 | Comparative product 1 | not added | — | 0.14 | D1 | 257 | Δ | 1.9 | X | X | X |
|  | V14-3 | Comparative product 2 | not added | — | 0.14 | D2 | 237 | X | 6.5 | X | X | Δ |
|  | V14-4 | Comparative product2 | not added | — | 2.45 | D3 | 111 | X | 28.5 | Δ | X | X |

TABLE V20-continued

| | Compound (A) | Compound (B) | (A)/(B) molar ratio | Addition amount (%) | Dispersant | Slurry flow value (mm) | Kneading time | Slurry viscosity (Pa·s) | Segregation resistance in water | amount of bleeding water | Hydration rate |
|---|---|---|---|---|---|---|---|---|---|---|---|
| V14-5 | Comparative product 3 | not added | — | 2.45 | D1 | 199 | Δ | 28.1 | Δ | Δ | X |

The addition amount in Table V20 is indicative of the total concentration (weight %) of compounds (A) and (B) in the aqueous phase of slurry.

Example v15

Slurries were prepared and determined in the same way as Example 15 except for those of Table V21.

TABLE V21

| W/C (%) | s/a (%) | Unit amount (kg/m³) | | | | Air (%) |
|---|---|---|---|---|---|---|
| | | W | C | S | G | |
| 53.7 | 46.0 | 173 | 322 | 798 | 966 | 4.5 | s/a: [S/(S + G)] × 100 (ratio by volume)

The materials of Table v21 were the same as those of Table 18.

TABLE V22

| | | Compound (A) Type | Compound (B) Type | (A)/(B) molar ratio | (A) + (B) Addition amount (weight %) | Dispersant Type | Dispersant weight % | Resistance to separation by vibration | Curing time | Strength in 3 days |
|---|---|---|---|---|---|---|---|---|---|---|
| Examples | 15-1 | A-1 | B-1 | 1/1 | 0.06 | D1 | 0.03 | ○ | ○ | ○ |
| | 15-2 | A-1 | B-2 | 1/1 | 0.5 | D1 | 0.03 | ⊚ | ○ | ○ |
| | 15-3 | A-1 | B-2 | 4/1 | 0.9 | D1 | 0.03 | ○ | ○ | ○ |
| | 15-4 | A-1 | B-3 | 1/1 | 1.0 | D1 | 0.04 | ⊚ | ○ | ○ |
| | 15-5 | A-2 | B-2 | 1/1 | 2.4 | D1 | 0.04 | ⊚ | ○ | ○ |
| | 15-6 | A-4 | B-5 | 1/5 | 1.0 | D3 | 0.05 | ○ | ○ | ○ |
| | 15-7 | A-8 | B-1 | 1/1 | 0.6 | D1 | 0.03 | ⊚ | ○ | ○ |
| | 15-8 | A-8 | B-2 | 1/1 | 0.6 | D4 | 0.05 | ⊚ | ○ | ○ |
| | 15-9 | A-8 | B-2 | 4/1 | 0.06 | D5 | 0.07 | ○ | ○ | ○ |
| | 15-10 | A-8 Comparative product 2* | B-2 | 1/1 | 0.2 | D1 | 0.04 | ⊚ | Δ | ○ |
| Comparative examples | 15-1 | — | — | — | — | D5 | 0.07 | X | ○ | ○ |
| | 15-2 | A-1 | — | — | — | D1 | 0.03 | X | ○ | ○ |
| | 15-3 | — | B-2 | — | 0.4 | D1 | 0.03 | X | ○ | ○ |
| | 15-4 | Comparative product 1 | — | — | 0.2 | D1 | 0.04 | X | Δ | ○ |
| | 15-5 | Comparative product 2 | — | — | 0.2 | D1 | 0.04 | X | X | Δ |
| | 15-6 | Comparative product 2 | — | — | 3.0 | D1 | 0.05 | Δ | X | X |
| | 15-7 | Comparative product 3 | — | — | 3.0 | D1 | 0.07 | ○ | X | X |

*The amount of Comparative Product2 in Example V15-10 is 0.2 weight % in slurry.

The weight % in Table V22 is indicative of the concentration of the active ingredients relative to the weight of cement.

Example IV16, IV17 and IV18 are below described with results of Table IV1, IV2 and IV3.

Example IV16

An aqueous solution (sample) including the compounds (A) and (B) in combination shown in Table IV1 was observed in view of association product in network. A sample of the aqueous solution was pressed on a copper plate, having been cooled with liquid nitrogen, to freeze it rapidly. The observation of association product in network was effected in the same way as Example V2-1. Results are shown in Table IV1. The length and the diameter are those of a strand association product forming network.

Figure 4:
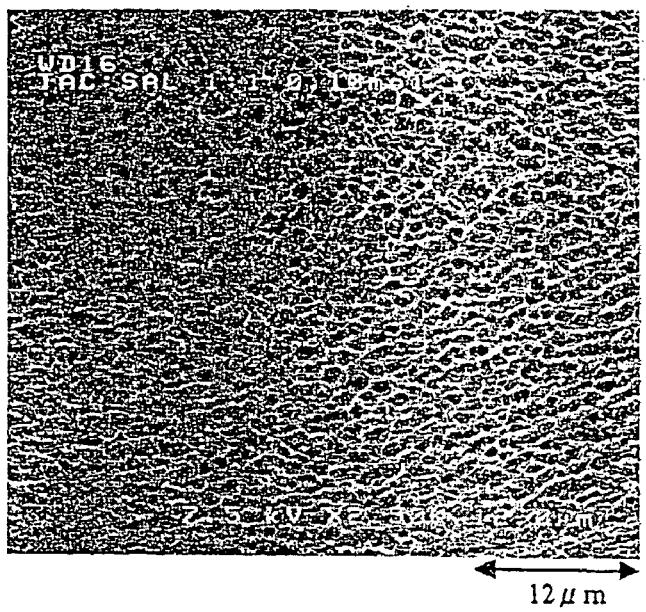
FIG. 4 shows network association product formed in the slurry of Example IV16.

For example, 1.6 parts by weight of hexadecyltrimethylammonium chloride (compound (A)), 0.97 part by weight of sodium p-toluenesulfonate (compound (B)) and 97.43 parts by weight of water were uniformly mixed to prepare a slurry. One drop of the slurry was pressed on a copper plate and rapidly frozen to obtain the sample of Example V16-1. It was observed. The other examples were observed in the same way as above. FIG. 4 shows a photo picture of association product in network formed in the aqueous solution. White association product in network is seen widely over the picture.

TABLE IV1

|  |  | Compound (A) | Compound (B) | (A)/(B) molar ratio | Concentration (A) + (B) (solid weight %) | association product in network existence of formation | length | diameter |
|---|---|---|---|---|---|---|---|---|
| Examples | IV16-1 | A-1 | B-1 | 1/1 | 2.0 | exist | ○ | ◎ |
|  | IV16-2 | A-2 | B-2 | 2/3 | 1.1 | exist | ○ | ◎ |
|  | IV16-3 | A-3 | B-3 | 1/1 | 1.5 | exist | ○ | ◎ |
|  | IV16-4 | A-4 | B-5 | 1/5 | 2.0 | exist | ○ | ○ |
|  | IV16-5 | A-5 | B-2 | 1/1 | 2.0 | exist | ○ | ◎ |
|  | IV16-6 | A-8 | B-2 | 2/3 | 2.0 | exist | ○ | ◎ |
|  | IV16-7 | A-1 | B-1 | 1/1 | 4.8 | exist | ○ | ◎ |
| Comparative examples | IV16-1 | Maleic acid | B-5 | 1/1 | 6.0 | none | — | — |
|  | IV16-2 | A-1 | glucose | 1/1 | 4.0 | none | — | — |

Example IV17

A slurry was obtained and observed in view of SS and turbidity in the same was as Example V2-2 except that 1 part by weight of the compounds (A) and (B), shown in Table IV2, having a ration of (A)/(B) shown in Table IV2, 100 parts by weight of normal Portland cement and 100 parts by weight of water were mixed.

TABLE IV2

|  |  | Compound (A) | Compound (B) | (A)/(B) molar ratio | SS | turbidity |
|---|---|---|---|---|---|---|
| Examples | IV17-1 | A-1 | B-1 | 1/1 | ○ | ○ |
|  | IV17-2 | A-2 | B-2 | 2/3 | ○ | ○ |
|  | IV17-3 | A-3 | B-3 | 1/1 | ○ | ○ |
|  | IV17-4 | A-5 | B-2 | 1/1 | ○ | ○ |
|  | IV17-5 | A-8 | B-2 | 2/3 | ◎ | ○ |
|  | IV17-6 | A-8 | B-1 | 1/1 | ◎ | ○ |
| Comparative examples | IV17-1 | — | — | — | X | X |
|  | IV17-2 | Comparative product 1 | — | — | X | X |
|  | IV17-3 | Comparative product 2 | — | — | X | X |
|  | IV17-4 | Comparative product 3 | — | — | Δ | X |
|  | IV17-5 | A-1 | Maleic acid | 1/1 | X | X |

Example IV18

An aqueous solution of the compounds (A) and (B) in combination shown in Table IV3 in an amount of 5 percent by weight in total of (A) and (B) was determined in view of modulus of storage elasticity G' in the same way as Example V2-3 except for the followings:

(Evaluation of $G'_{min}/G'_{max}$)
◎: $G'_{min}/G'_{max}$ of not less than 0.7 and less than 1.0
○: $G'_{min}/G'_{max}$ of not less than 0.5 and less than 0.7
Δ: $G'_{min}/G'_{max}$ of not less than 0.4 and less than 0.5
X: $G'_{min}/G'_{max}$ of less than 0.4

Figure 5:
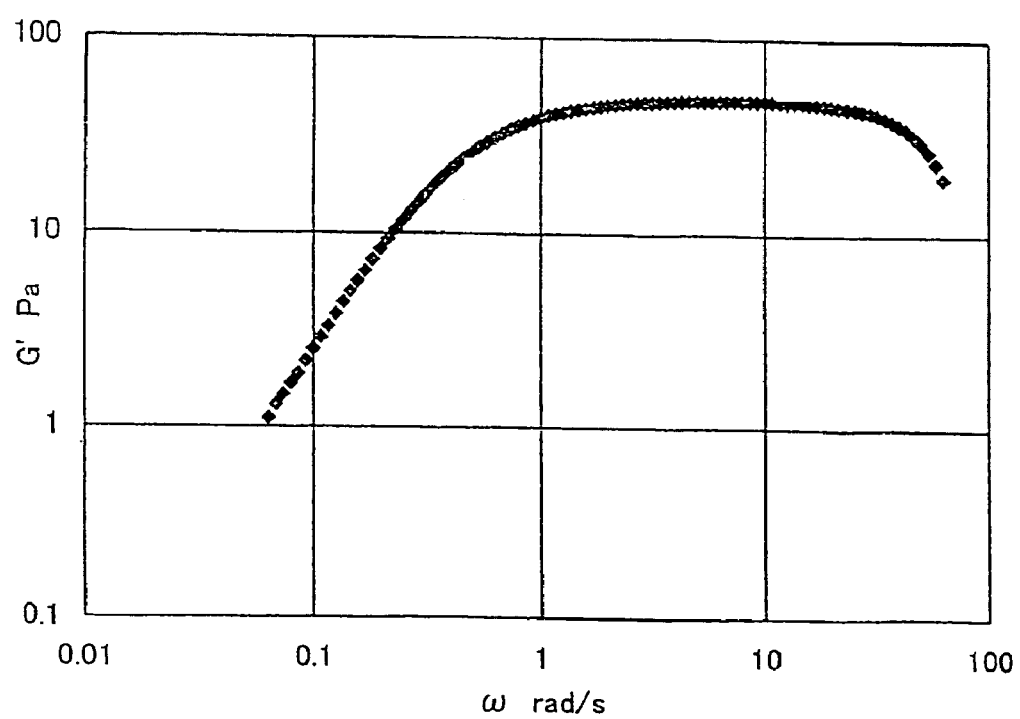
FIG. 5 is a graph showing the relation between the angular ω and the modulus of storage elasticity G' in determination of viscoelasticity of Example IV18.

(Evaluation of $G'_{max}$)
◎: $G'_{max}$ of 10~100 Pa
○: $G'_{max}$ of 5~500 Pa, except for ◎
Δ: $G'_{max}$ of 2~1000 Pa, except for ◎ and ○
X: $G'_{max}$ of less than 2 Pa or more than 1000 Pa Results of Example IV18-7 are shown in FIG. 5. It is noted in FIG. 5 that G' was almost constant at the angular velocity ω of 1~10 rad/s, $G'_{min}$ was 39 Pa (ω=1 rad/s), $G'_{max}$ was 48 Pa (ω=7.3 rad/s) and $G'_{min}/G'_{max}$ was 0.8.

TABLE IV3

|  |  | Compound (A) | Compound (B) | (A)/(B) molar ratio | $G'_{min}/G'_{max}$ | $G'_{max}$ |
|---|---|---|---|---|---|---|
| Exampless | IV18-1 | A-1 | B-1 | 1/1 | ◎ | ◎ |
|  | IV18-2 | A-2 | B-2 | 2/3 | ◎ | ◎ |
|  | IV18-3 | A-3 | B-3 | 1/1 | ◎ | ◎ |
|  | IV18-4 | A-5 | B-2 | 1/1 | ◎ | ◎ |
|  | IV18-5 | A-8 | B-2 | 2/1 | ◎ | ◎ |
|  | IV18-6 | A-8 | B-1 | 1/1 | ◎ | ◎ |
|  | IV18-7 | A-1 | B-2 | 1/1 | ◎ | ◎ |
| Comparative examples | IV18-1 | Comparative product 1 | — | — | X | X |
|  | IV18-2 | Comparative product 2 | — | — | X | Δ |

TABLE IV3-continued

| | Compound (A) | Compound (B) | (A)/(B) molar ratio | $G'_{min}/G'_{max}$ | $G'_{max}$ |
|---|---|---|---|---|---|
| IV18-3 | Comparative product 3 | — | — | X | Δ |

What is claimed:

1. A process for producing a slurry, which comprises:
adding a slurry rheology modifier to a slurry composition, wherein the slurry rheology modifier comprises a first water-soluble low-molecular compound (referred to hereinafter as compound (A)) and a second water-soluble low-molecular compound (referred to hereinafter as compound (B)) being different from the compound (A), wherein the viscosity of an aqueous solution at 20° C. prepared by mixing an aqueous solution $S_A$ (with a viscosity at 20° C. of 100 mPa's or less) of compound (A) with an aqueous solution $S_n$ (with a viscosity at 20° C. of 100 mPa's or less) of compound (B) in the ratio of 50/50 by weight can be at least twice as high as the viscosity of either aqueous solution before mixed;
wherein said adding step comprises preparing a slurry containing one compound (A) or (B) for the slurry rheology modifier, powder and water, and then adding the other compound (A) or (B) to the slurry;
wherein compound (A) and compound (B) having the following Necessary Conditions 1 and 3:
Necessary Condition 1:
a combination of compound (A) and compound (B) is selected from (1) combination of a compound selected from amphoteric surfactants and a compound selected from anionic surfactants, (2) combination of a compound selected from cationic surfactants and a compound selected from anionic aromatic compounds and (3) combination of a compound selected from cationic surfactants and a compound selected from NaBr, KBr and HBr,
Necessary Condition 3:
the amphoteric surfactant is at least one selected from dodecanoic acid amide propyl betaine, octadecanoic acid amide propyl betaine and dodecyl dimethyl aminoacetic acid betaine,
the anionic surfactant is at least one selected from POE (3) dodecyl ether sulfate, POE (2) dodecyl ether sulfate and POE (4) dodecyl ether sulfate,
the cationic surfactant is at least one selected from alkyl ($C_{10-26}$) trimethyl ammonium salt, alkyl ($C_{10-26}$) pyridinium salt, alkyl ($C_{10-26}$) imidazolinium salt and alkyl ($C_{10-26}$) dimethyl benzyl ammonium salt,
the anionic aromatic compound is at least one selected from salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenol sulfonic acid, m-xylene-4-sulfonic acid, cumene sulfonic acid, methyl salicylic acid, styrene sulfonic acid, chlorobenzoic acid and a salt of the before mentioned acid;
wherein the powder is selected from the group consisting of cement, gypsum, and filler; and
wherein the filler is selected from the group consisting of calcium carbonate, fly ash, blast furnace slag, and fumed silica.

2. The process of claim 1 for producing a slurry, wherein the combination of compounds (A) and (B) is selected from (1) combination of compound (A) selected from amphoteric surfactants and compound (B) selected from anionic surfactants, (2) combination of compound (A) selected from cationic surfactants and compound (B) selected from anionic aromatic compounds and (3) combination of compound (A) selected from cationic surfactants and compound (B) selected from brominated compounds; and wherein the molar ratio of compound (A) to compound (B) as active ingredients, that is, compound (A)/compound (B), is in the range of 1/20 to 20/1.

3. The process of claim 1 for producing a slurry, wherein the combination of compounds (A) and (B) is selected from (1) combination of compound (A) selected from amphoteric surfactants and compound (B) selected from anionic surfactants, (2) combination of compound (A) selected from cationic surfactants and compound (B) selected from anionic aromatic compounds and (3) combination of compound (A) selected from cationic surfactants and compound (B) selected from brominated compounds; and wherein the sum of compounds (A) and (B) as active ingredients, in terms of the actual concentration thereof in the aqueous phase of slurry, is in the range of 0.01 to 20% by weight.

4. The process of claim 1 for producing a slurry, wherein the slurry rheology modifier molar ratio of compound (A) to compound (B) as active ingredients, that is, compound (A)/compound (B), is in the range of 1/20 to 20/1.

5. The process of claim 1 for producing a slurry, wherein the slurry rheology modifier is the sum of compounds (A) and (B) as active ingredients, in terms of the actual concentration thereof in the aqueous phase of slurry, and is in the range of 0.01 to 20% by weight.

6. A slurry produced by the process of claim 1.

7. A slurry produced by the process of claim 1, which is a hydraulic slurry further comprising hydraulic powder and water.

8. A slurry produced by the process of claim 1, which is a hydraulic slurry further comprising hydraulic powder and a dispersant.

9. A slurry produced by the process of claim 1, which further comprises aggregates.

* * * * *